United States Patent Office 3,640,953
Patented Feb. 8, 1972

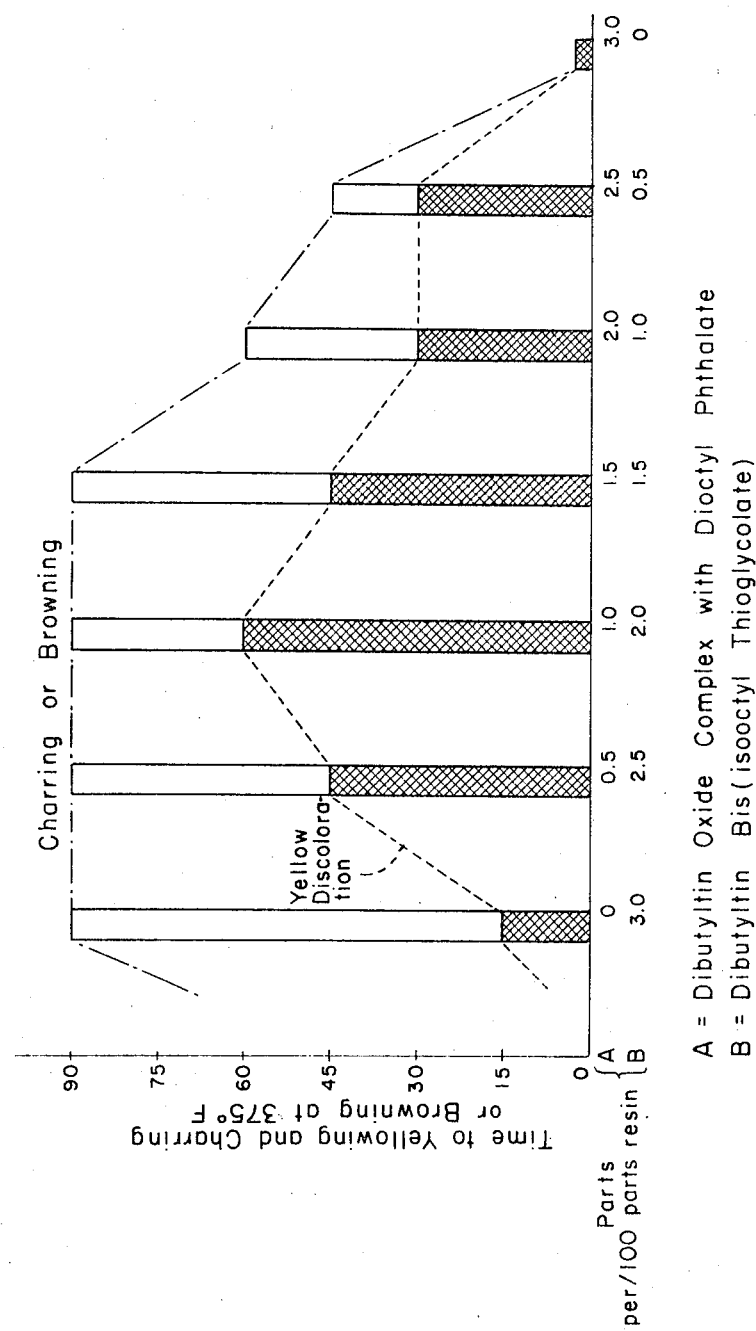

3,640,953
STABILIZATION OF POLYVINYL CHLORIDE RESINS
Lawrence R. Brecker, Brooklyn, and Alfred Thee, Long Beach, N.Y., assignors to Argus Chemical Corporation, Brooklyn, N.Y.
Filed Jan. 23, 1969, Ser. No. 793,503
Int. Cl. C08f 45/62
U.S. Cl. 260—45.75 K          24 Claims

ABSTRACT OF THE DISCLOSURE

A polyvinyl chloride resin stabilizer combination having a readily controlled tin content is provided which lessens the development of early discoloration of the resin when heated at elevated temperatures, for example, 350° F., comprising a diorganotin mercaptocarboxylic acid ester and a diorganotin oxide-ester complex which is a reaction product of a diorganotin oxide and an ester of an oxygen-containing acid. The above stabilizer components can be liquids or solids. However, where the stabilizer components are liquid, a homogeneous stable liquid mixture is formed.

Polyvinyl chloride resin compositions and a process for stabilizing such resins are also provided, using the above stabilizer combination, the resins having as a result increased resistance to the development of early discoloration when heated at elevated temperatures.

A process also is provided for preparing organotin stabilizer compositions having a low to high tin content controllable over a wide range without limitations due to stoichiometric considerations.

SPECIFICATION

This invention relates to polyvinyl chloride resin stabilizer compositions having a controlled tin content, and comprising a diorganotin mercaptocarboxylic acid ester and a diorganotin oxide complex with an ester of an oxygen-containing acid, and optionally, a stannous tin salt; to polyvinyl chloride resin compositions containing such stabilizer compositions and having as a result an improved resistance to the development of early discoloration during heating at elevated temperatures; to a process for improving the resistance of polyvinyl chloride resins to development of early discoloration, when heated at elevated temperatures, using such compositions; and to a process for preparing organotin stabilizers having a tin content readily controllable over a wide range without limitations due to stoichiometric considerations.

BACKGROUND AND PRIOR ART

The stabilizing effectiveness of organotin stabilizers for polyvinyl chloride resins is generally associated with the type of organotin group, tin content, and the anion linked to the organotin group. In the development of the organotin stabilizer the aim has always been to find the proper balance of these factors and combine them, preferably in a single compound.

Thus, for example, organotin oxides and sulfides were suggested in U.S. Pat. No. 2,267,777 to Yngve, U.S. Pat. No. 2,746,946 to Weinberg and U.S. Pat. No. 3,021,302 to Frey as stabilizers for polyvinyl chloride. These products offer the highest possible tin and sulfur anion content (which are considered the active components) per molecule. However, these materials are not very effective stabilizers and have never achieved any commercial success. With regard to these materials, it must, of course, be kept in mind that the organotin oxide have only a superficial similarity to the organotin sulfide, and are really very different, both physically and in their stabilizing effectiveness. The sulfides are generally liquids, and the oxides are solids; the oxides have no odor, and are generally incompatible with polyvinyl chloride resin compositions, and particularly with other liquid additives for the resins, whereas sulfides have a very unpleasant odor but are compatible. Thus, these compounds are not really equivalent, although they are mentioned together in the patent literature.

U.S. Pats. Nos. 2,597,920 to Carroll dated May 27, 1952 and 2,763,632 to Johnson dated Sept. 18, 1956 disclose reaction products of diorganotin oxides and esters of oxygen-containing acids, such as ethyl acetate and butyl butyrate, as heat and light stabilizers for vinyl chloride resins. However, these reaction products are also rather poor in stabilizing effectiveness, despite their relatively high tin content, and are incapable of meeting modern standards for stabilizers.

Other disclosures of polymeric organotin compounds, which geneally include a chain of tin atoms connected through oxygen or sulfur atoms, are set out in U.S. Pats. Nos. 2,626,953, dated Jan. 27, 1953; 2,628,211, dated Feb. 10, 1953; 2,938,013, dated May 24, 1960 and 3,184,430, dated May 18, 1965. However, none of these organotin compounds is effective enough to meet the requirements of present day stabilizers.

Of all the organotin compounds disclosed in the literature, the organotin mercaptides have been recognized as providing the most effective stabilization, and within this general group of organotin compounds, the organotin mercaptoacid esters have become most prominent, and are now recognized as being the most effective stabilizers for inhibiting the degradation of polyvinyl chlorides resins at high temperatures; e.g., 350° F. or 375° F., to which they are subjected during processing. This specific class of organotin stabilizers has been described in U.S. Pats. No. 2,641,588 and 2,641,596 to Leistner et al., U.S. Pat. No. 2,648,650 to Weinberg et al., and U.S. Pat. No. 2,809,956 to Mack et al. Furthermore, even within this limited class of organotin mercapto esters, only one type in particular has achieved outstanding commercial success, and that is the dialkyltin bis-alkyl thioglycolates. The dialkyltin bis-alkyl thioglycolate esters have set the standards in the art, and the efforts of the industry have been directed to match or to improve on this particular type.

The search for even better stabilizers is primarily motivated because of certain drawbacks of the dialkyltin bis-alkyl thioglycolates. First of all, they are mercaptides, and thus produce an objectionable odor during the processing of resins at elevated temperatures, and the resins often retain some of this odor in the finished article. A further drawback is their adverse effect on light stability which is also caused by the mercapto group. Another drawback is their inability to completely prevent early discoloration, that is, the yellowing which develops during the first 15 to 30 minutes of heating, particularly in clear rigid formulations.

Although early discoloration is not nearly so intense as later discoloration and embrittlement, arising from heat deterioration of the resin, it has been recognized that the early discoloration arising during the first 15 to 30 minutes of heating affects a relatively greater proportion of the resin. This is because the average period of time during which a given amount of resin product remains in the processing equipment, even in a continuous process which includes recycling of portions of the worked product, is less than thirty minutes. Only a minor portion of the resin will be subjected to working temperatures for periods of up to one hour or longer. Hence, the preservation of a good color during the first thirty minutes of heating can be more important than the protection of the relatively smaller proportion of the resin by long term heat stabilizers, such as the organotin mercapto acid esters.

A non-organotin stabilizer combination capable of minimizing initial color and retaining good long term stability is disclosed in U.S. Pat. No. 2,997,454, patented Aug. 22, 1961, to Leistner et al., based on heavy metal salts of a higher fatty acid, and organic triphosphites, or such phosphites and polyvalent metal salts of hydrocarbon-substituted phenols, combined with an acid phosphorus compound having at least one acidic hydrogen atom attached through oxygen to phosphorus. This type of compound is not useful with organotin compounds to minimize early discoloration.

A number of patents have been directed to improving organotin-based stabilizers. For example, U.S. Pat. No. 2,914,506 to Mack et al., dated Nov. 24, 1959, suggests combinations of organotin thioglycolates with metallic and non-metallic stabilizers, including metal salts, epoxy compounds, phosphites and phenols. U.S. Pat. No. 2,938,013 to Mack et al., dated May 24, 1960, discloses combinations of organotin half ester maleates with other organotin compounds, metal salts, phosphites and epoxy compounds. Lazcano British Pat. No. 1,008,589, published Oct. 27, 1965, discloses combinations of organotin half ester maleates and thioglycolates with other metal salts, phenols, epoxy compounds, phosphites and polyols. None of these combinations is effective in significantly minimizing early discoloration.

British Pat. No. 874,574 to Luz, published Aug. 10, 1961, describes stabilizer compositions composed of organotin salts of carboxylic acids, such as dibutyl tin diacetate and free thioglycolic acid esters. These compositions are not any better, from the standpoint of early discoloration, than the organotin mercapto acid ester salts. British Pat. No. 771,857 published Apr. 3, 1957, discloses combinations of mercapto acid esters in a large excess with organotin oxides.

Wooten et al., U.S. Pat. No. 3,063,963, issued Nov. 13, 1962, disclose combinations of organotin carboxylates of mono- or dicarboxylic acids with omega mercapto acids or mercapto alcohols to improve weathering resistance of polyvinyl chloride resins.

More recently, U.S. Pat. No. 3,396,185 to Heckenbleikner et al. discloses specific types of polymeric monoalkyltin compounds. However, mono-alkyltin compounds, although known for a long time, have not found much success as polyvinyl chloride stabilizers, compared to the dialkyltin derivatives.

French Pat. No. 1,472,990 to Albright and Wilson discloses organotin mercaptides having at least one halogen attached to the tin atom. These compounds when used as polyvinyl chloride stabilizers prevent early discoloration of the polyvinyl chloride resin on heating, but shorten considerably the long-term stability, and therefore have very limited utility. In any event, these materials are still not comparable to the well-known simple dialkyltin mercapto acid esters.

Netherlands patent publication No. 6707180 to Deutsche Advance teaches combinations of conventional well known dialkyltin mercaptides with the polymeric organotin compounds of Heckenbleikner (U.S. Pat. No. 3,396,185, discussed above), which involves combining monoalkyltin and dialkyltin compounds.

Canadian Pat. No. 794,373 dated Sept. 10, 1968, describes novel organotin stabilizers derived from the reaction of organotin oxides or sulfides or hydrocarbyl tin stannonic or thio stannonic acids or esters with organotin salts of mercapto monocarboxylic acid esters. These new organotin mercapto acid ester compounds have the formula

where R is a monovalent organic group, generally an alkyl group, $n$ is an integer from 1 to 3, and Z has the formula

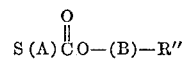

wherein R'' is the monovalent radical of an alcohol used to esterify the carboxyl group of the mercapto acid and generally is an alkyl group having not more than 20 carbon atoms, A is phenylene or an alkylene chain of at least two methylene groups, which may be interrupted by phenylene, B is RRSnO, RRSnS, RSnOOH, RSnSSH, RSnOOR'' or RSnSSR'', wherein R and R'' are as defined above. However, these compounds do not avoid the stoichiometric limitations, because of the limits imposed by this formula. It is necessary to form the reaction products, it is explained, because organotin oxides and organotin sulfides are incompatible with organotin mercapto acid esters, and with polyvinyl chloride resins. The structural relationship, i.e., the position of the mercapto group relative to the carboxyl group, is very critical. A (which may include a phenylene group) must have at least two carbon atoms intervening between the —S— and —COOR groups. Esters of suitable acids are the esters of mercaptopropionic acid, β- to ω-mercapto lauric acids, mercaptophenyl acetic acid and mercaptobenzoic acid. This class of tin compounds suffers from the inherent limitation that the α-mercaptoacid esters are excluded. Esters of thioglycolic acid will not react with the excess dialkyltin oxide to form the novel stabilizers, and these esters happen to be the least expensive and most readily available.

In addition to the problem of imparting early discoloration to polyvinyl chloride resins, organotin mercapto acid esters have the disadvantage that for any given mercaptoacid ester group, for example, isooctyl thioglycolate, the tin content of the dialkyltin salt, e.g., dibutyltin salt, remains fixed. Therefore, where a high tin content in the resin is required, it is necessary to use a large amount of organotin mercapto acid ester to supply the necessary tin, and this can be costly. This is the inherent disadvantage that arises when the tin content is limited to the stoichiometric amount of tin that reacts with the organic moiety in forming the organotin compound.

STATEMENT OF THE INVENTION

In accordance with this invention, there are provided less costly organotin mercaptoacid ester containing stabilizer compositions for polyvinyl chloride resins which have no mercaptan odor, are compatible with the resins, lessen development of early discoloration of the resin when heated at elevated temperatures, and have a controlled tin content, comprising (a) At least one diorganotin mercapto acid ester which has from one to two mercapto carboxylic acid ester groups having from two to about sixty carbon atoms, linked to tin through a mercapto sulfur atom, and two hydrocarbon groups having from one to about thirty carbon atoms, linked to tin through carbon and (b) An organotin complex derived from the reaction of a diorganotin oxide and an ester of an oxygen-containing acid.

Further, in accordance with the invention, there are provided homogeneous stable liquid stabilizer compositions comprising (a) and (b) above.

In the stabilizer combinations of the invention the tin content can be low or high, and controlled within wide ranges, without limitation by stoichiometric requirements. The tin content of the stabilizer combination of the invention can be adjusted to within the range from 10% to 45%, from only slightly less than the corresponding organotin oxide, to only slightly more than the organotin mercaptocarboxylic acid ester. It can even be less than the ester, if desired, for special purposes, down to as low as 5%, but usually from 15% to 25% is preferred.

Control of tin content is obtained by any or all of the following techniques:

(1) By selection of the two components of appropriate tin contents, (2) By adjusting the relative proportions of the more expensive organotin mercaptoacid ester and the less expensive organotin oxide-ester reaction product, (3) By adjusting the amount of organotin oxide employed in reaction with the ester of the oxygen-containing acid to form the organotin oxide-ester reaction product (see the section entitled Proportions of Components in Stabilizer Combination, below).

Tis gives a very precise adjustment of tin content, never before so readily obtainable.

There are also provided, in accordance with the invention, polyvinyl chloride resin compositions consisting essentially of a polyvinyl chloride resin, a diorganotin mercapto acid ester, and an organotin complex derived from reaction of a diorganotin oxide and an ester of an oxygen-containing acid.

In addition, in accordance with the invention, a process for enhancing the resistance of polyvinyl chloride resins to the development of early discoloration is provided, which comprises incorporating with a polyvinyl chloride resin a diorganotin mercapto acid ester and an organotin complex derived from reaction of a diorganotin oxide and an ester of an oxygen-containing acid.

Still further in accordance with the invention, a process is provided for preparing organotin stabilizer combinations having a tin content controllable over a wide range without limitations imposed by stoichiometric considerations, which comprises combining a complex formed by the reaction of a diorganotin oxide and an ester of an oxygen-containing acid and having a tin content within the range from about 1 to about 50% by weight of the complex with a diorganotin mercapto acid ester, to provide an overall tin content in the mixture within the range from about 5 to about 45%.

The complex reaction products of the diorganotin oxides with the esters of the oxygen-containing acids act to enhance the effectiveness of the organotin mercapto acid esters in improving resistance of polyvinyl chloride resins to development of early yellow discoloration which sets in during the first fifteen to thirty minutes of heating at 350 to 375° F. and they may at the same time improve the long term heat stability. This effect on early yellow discoloration is indeed surprising, inasmuch as the organotin oxide-ester complexes alone do not enhance resistance of polyvinyl chloride resins to development of early discoloration at high temperatures and, in fact, impart considerable early discoloration of their own to the resin. These diorganotin oxide-ester complexes further eliminate the disagreeable mercaptan odor when blended with the diorganotin mercapto-acid esters. Because of the lesser diorganotin mercapto-acid ester content in these stabilizer formulations, the overall mercaptan content is reduced and light stability and sulfide stain resistance improved and at the same time cost is reduced because of the inexpensive complex as compared to the organotin mercaptoacid esters.

The diorganotin oxide-ester complexes and the diorganotin mercapto acid esters can be liquids or solids. If liquid, they can be blended to form stable homogeneous solutions which have an advantage in that they can be metered out accurately and uniformly.

The organotin mercapto acid esters

The diorganotin mercapto acid esters can be monomeric or polymeric, but are preferably monomeric. The monomers can be defined as diorganotin compounds having organic radicals linked to tin only through carbon, and sulfur, and having the general formula:

I

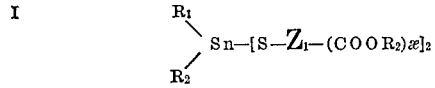

The $S-Z_1-COOR_3$ group is derived from a mercapto carboxylic acid ester.

$m$ is the number of $COOR_3$ groups and is an integer from one to four, preferably one to two.

$R_3$ is an organic group derived from a monohydric or polyhydric alcohol having from one to about four hydroxyl groups and from about one to about thirty carbon atoms, preferaby from two to five carbon atoms, in the case of polyols, and from six to twenty-five carbon atoms in the case of monohydric alcohols. If there is more than one $COOR_3$ group, the $R_3$ radicals can be the same or different.

$R_1$ and $R_2$ are hydrocarbon radicals which can be the same or different having from about one to about thirty carbon atoms, preferably from about three to about eight carbon atoms and can be selected from among alkyl, aryl, cycloalkyl, alkylcycloalkyl, cycloalkylalkyl and arylalkyl. $R_1$ and $R_2$ can, for example, be methyl, ethyl, propyl, isopropyl, n-butyl, isobutyl, tert-butyl, amyl, hexyl, octyl, 2-ethylhexyl, iso-octyl, nonyl, isononyl, decyl, undecyl, lauryl, palmityl, stearyl, myristyl, behenyl, cyclobutyl, cyclohexyl, methyl cyclohexyl and cyclopentyl, phenyl, benzyl, cumyl, tolyl and xylyl.

$Z_1$ is a bivalent organic radical carrying the S and $COOR_3$ groups, and in addition can contain halogen, free carboxylic acid groups, keto groups, mercapto groups, carboxylic acid salt groups, ether groups and hydroxyl groups. The $Z_1$ radical has from one to about thirty carbon atoms, and preferably from about one to about five carbon atoms, such as an alkylene, arylene or cycloalkylene radical.

The $S-Z_1-(COOR_3)_m$ groups are derived from mono- or polymercapto carboxylic acid esters by removal of the hydrogen atom of the mercapto group. These include the esters of aliphatic, aromatic, cycloaliphatic and heterocyclic acids which contain at least one mercapto group, and can also contain inert substituents such as halogen, hydroxyl, keto and alkoxy groups, such as for example, esters of mercaptoacetic acid, mercaptopropionic acid, mercaptooleic acid, mercaptoricinoleic acid, mercaptolinoleic acid, mercaptostearic acid, mercaptobutyric acid, mercaptovaleric acid, mercaptohexanoic acid, mercaptooctanoic acid, thiolactic acid, mercaptolevulinic acid, mercaptolauric acid, mercaptobehenic acid, dithiotartaric acid, mercaptopalmitic acid, mercaptobenzoic acid, mercaptomethylbenzoic acid, mercaptocyclohexane carboxylic acid, mercaptofuroic acid, thiomalic acid, mercaptoglutaric acid, mercaptoazelaic acid, mercaptomalonic acid, mercaptoadipic acid, mercaptopimelic acid, mercaptosuberic acid, mercaptosebacic acid, mercaptophenylacetic acid and mercaptoterephthalic acid.

$R_3$ is an organic group derived from a monohydric or polyhydric alcohol of the formula $R_4-(OH)_{n_4}$ where $n_4$ is an integer from one to about four, but is preferably one or two. Thus, $R_4$ can be alkyl, alkylene, alkenyl, aryl, arylene, mixed alkyl-aryl, mixed aryl-alkyl, cycloaliphatic and heterocyclic, and can contain from about one to about thirty carbon atoms, and can also contain ester groups, alkoxy groups, hydroxyl groups, halogen atoms and other inert substituents. Preferably, $R_4$ is derived from a monohydric alcohol containing from one to about thirty carbon atoms, such as methyl, ethyl, propyl, n-butyl, t-butyl, isobutyl, octyl, isooctyl, 2-ethylhexyl, decyl, lauryl, octadecyl, myristyl, palmityl, oleyl, dodecyl, isotridecyl, and ricinoleyl alcohols, cyclic monohydric alcohols, such as cyclopropanol, 2,2-dimethyl-1-cyclopropanol, cyclobutanol, 2-phenyl-1-cyclobutanol, cyclopentanol, cyclopentenol, cyclohexanol, cyclohexenol, 2-methyl-, 3-methyl-, and 4-methyl-cyclohexanol, 2-phenyl-cyclohexanol, 3,3,5-trimethyl cyclohexanol, 1,4-cyclohexadiene-3-ol, cycloheptanol, cycloheptene-3-ol, 1,5-cycloheptadiene-3-ol, 2-methyl-, 3-methyl- and 4-methyl cycloheptanol, cyclooctanol, cyclooctenol, cyclononanol, cyclodecanol, cyclodecene-3-ol, cyclododecanol, the para-methanols, such as 3-hydroxy-p-methane, 2-hydroxy-p- menthane, the para-menthenols such as α-terpineol, borneol, pine oil, fenchol, 2,2-di-methyl-3,6-endo-methylene cyclohexanol, methyl borneol, 2,2,10-trimethyl-3,6-endo-methylene cyclohexanol, the cyclic sesquiterphenols such as farnesol and nerolidol, the sterols such as cholesterol, dihydrocholesterol, ergosterol, 24-ethyl cholsterol, the condensed alicyclic alcohols such as 1-, and 2-hydroxy-1,2,3,4-tetrahydronaphthalene and 1-, and 2-hydroxydecahydronaphthalene, or from a dihydric alcohol such as glycols containing from two to about thirty carbon atoms, including ethylene glycol, propylene glycol, diethylene glycol, dipropylene glycol, tetramethylene glycol, neopentyl glycol and decamethylene glycol, 2',2'-4-trimethyl pentane-diol, 2,2',4,4'-tetramethyl cyclobutane-diol, cyclohexane - 1,4 - dimethanol, 4,4'-isopropylidene-dicyclohexanol, and polyols such as glycerine, triethylol propane, mannitol, sorbitol, erythritol, dipentaerythritol, pentaerythritol, and trimethylol propane.

Preferred monohydric alcohols are $C_6$–$C_{25}$ aliphatic alcohols and cyclohexanol. Preferred polyhydric alcohols are ethylene glycol, propylene glycol, neopentyl glycol, pentaerythritol and trimethylol propane.

The diorganotin thioglycolates, α and β-mercaptopropionates and thiomalates are preferred as the organotin mercapto acid ester component. These are the most practical of the organotin mercapto acid esters from the standpoint of availability, cost and performance. These diorganotin mercapto acid esters are mostly liquids and are compatible with polyvinyl chloride resins and other stabilizers therefor, and form homogeneous solutions with the diorganotin oxide-ester complexes.

The diorganotin mercaptoacid esters, where not known, can be readily prepared by reaction of the mercaptocarboxylic acid esters with the corresponding organotin oxide or chloride. For a more complete explanation of the process for making, and for additional examples of, these organotin mercapto ester compounds, see U.S. Pats. Nos. 2,648,650 to Weinberg et al., 2,641,596 and 2,752,325 to Leistner, and 3,115,509 to Mack, and Canadian Pat. No. 649,989 to Mack.

The organotin mercapto acid esters containing two different mercapto acid ester groups can be prepared by reacting the desired organotin oxide or chloride with a mixture of the mercapto acid esters, or by heating the two different organotin esters together.

Polymeric diorganotin mercaptoacid esters can be defined by the formula:

II. 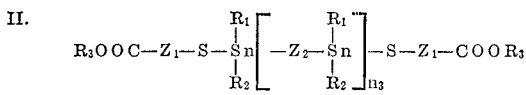

wherein $R_1$, $R_2$, $R_3$ and $Z_1$ are as defined previously and wherein $Z_2$ is a bivalent group, such as sulfur, a mercapto acid group, or a mercapto alkanol group, and $n_3$ is a number from one to about twenty.

The $Z_2$ mercapto acid group can have the formula:

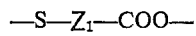

and the $Z_2$ mercaptoalkanol group can have the formula:

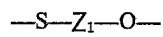

The following diorganotin mercapto carboxylic acid esters are typical of those coming within the invention:

1. 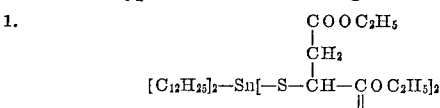

2. 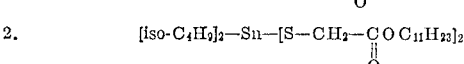

3. 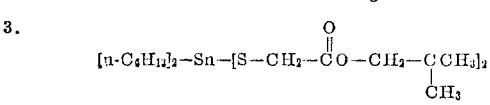

4. 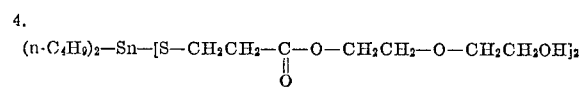

5. 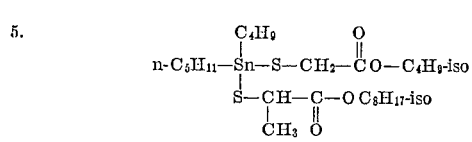

6. 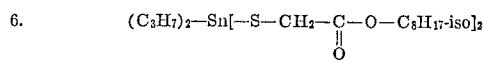

7. 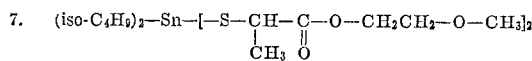

8. 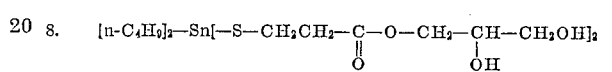

9. 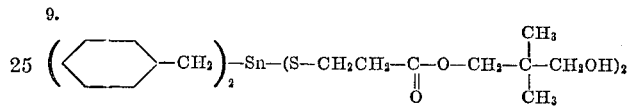

10. 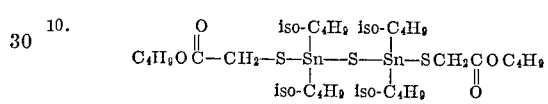

11. 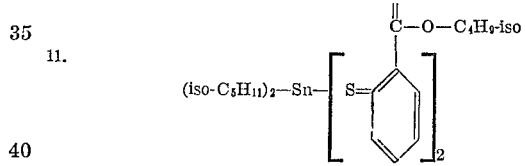

12. 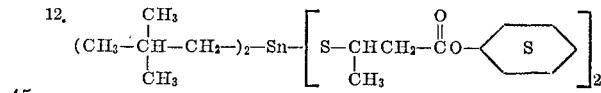

13. 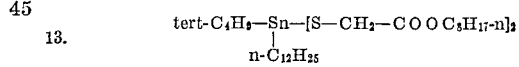

14. 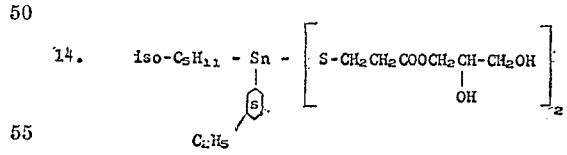

15. 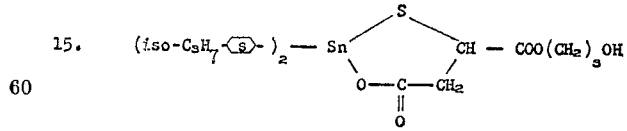

16. 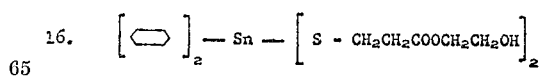

17. 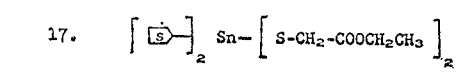

18. 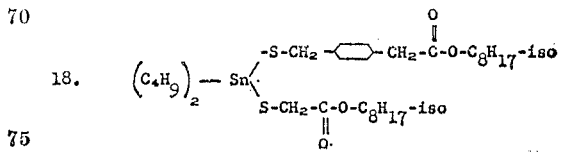

19. 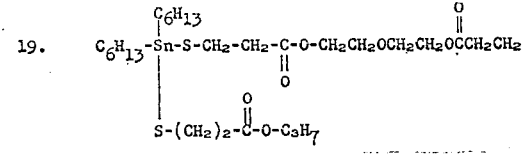

20. 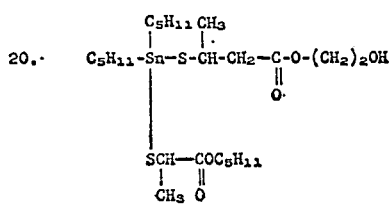

21. 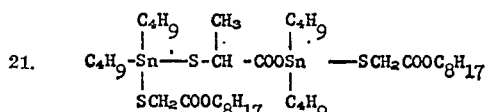

22. 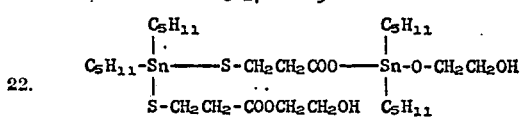

The organotin oxide-ester reaction products

The diorganotin oxides useful in preparing the organotin oxide-ester complexes employed in this invention contain organic groups linked to tin only through carbon, and can be represented by the following formula:

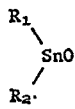

III

Each compound contains per tin atom two hydrocarbon radicals ($R_1$ and $R_2$) having from about one to about thirty carbon atoms, preferably from about three to about eight carbon atoms, which can be selected from among alkyl, alkenyl, aryl, cycloalkyl, alkylcycloalkyl, cycloalkylalkyl and arylalkyl. $R_1$ and $R_2$ can, for example, be methyl, ethyl, propyl, isopropyl, n-butyl, isobutyl, tert-butyl, sec-butyl, amyl, hexyl, octyl, 2-ethylhexyl, iso-octyl, isononyl, nonyl, decyl, undecyl, lauryl, palmityl, stearyl, myristyl, behenyl, phenyl, benzyl, cumyl, tolyl, xylyl, cyclobutyl, cyclohexyl, methyl cyclohexyl, and cyclopentyl.

Examples of organotin oxides which can be employed in preparing the organotin oxide-ester complex include, but are not limited to, dimethyltin oxide, diethyltin oxide, dipropyltin oxide, dibutyltin oxide, diamyltin oxide, dioctyltin oxide, didecyltin oxide, dilauryltin oxide, dipropenyltin oxide, diphenyltin oxide, dinaphthyltin oxide, ditolyltin oxide, methylethyltin oxide, phenylbutyltin oxide, dibenzyltin oxide, dixylyltin oxide, dicyclobutyltin oxide, dicyclohexyltin oxide, methylcyclohexyltin oxide, and dicumyltin oxide.

The esters which are employed for reaction with the organotin oxide are esters of an organic monocarboxylic or polycarboxylic acid or an inorganic oxygen-containing acid and a monohydric or polyhydric alcohol or phenol. Such organic acid esters include aliphatic, cycloaliphatic and aromatic carboxylic acid esters of aliphatic, cyclo- aliphatic, and aromatic monohydric or polyhydric alcohol or phenol, and contain from two to about one thousand carbon atoms and one to about six carboxylic acid ester groups. Exemplary esters which can be employed are known, and are disclosed in U.S. Pats. Nos. 2,597,920 to Carroll and 2,763,632 to Johnson, which disclosures are incorporated herein by reference.

The esters of oxygen-containing acids useful in this invention include, but are not limited to, ethyl ortho silicate, triethyl arsenate, n-propyl nitrate, n-octyl nitrate, o-cresyl - p - toluene sulphonate, cyclohexyl p-toluene sulphonamide, di-n-propyl sulfate, di-n-dodecyl sulfate, trimethyl phosphate, triethyl phosphate, tri-n-propyl phosphate, tributylphosphate, triisobutyl phosphate, triamyl phosphate, tri-o-cresyl phosphate, tri-p-cresyl phosphate, tri-m-cresyl, phosphate, triphenyl phosphate, trixylyl phosphate, butyl di-($\beta$-methoxyethyl) phosphate, butyl di($\beta$-ethoxyethyl) phosphate, sorbityl hexaphosphate, amyl borate, methyl acetate, ethyl acetate, n-propylacetate, isopropyl acetate, butyl acetate, m-cresyl acetate, phenyl acetate, ethylene glycol diacetate, diglycerol tetraacetate, glycerol monolactate acetate, methyl propionate, n-butyl propionate, sec-butyl propionate, ethylene glycol dipropionate, triethylene glycol dipropionate, ethyl butyrate, n-propyl butyrate, butyl butyrate, pentyl butyrate, 2-propenyl butyrate, hexyl butyrate, ethylene glycol dibutyrate, ethyl laurate, phenyl laurate, ethyl stearate, butyl stearate, ethyl palmitate, 2-naphthyl lactate, ethyl benzoate, $\beta$-naphthyl benzoate, benzyl benzoate, methyl-o-benzoyl benzoate, ethyl-o-benzoyl benzoate, amyl benzoate, sorbityl hexabenzoate, diethyl oxalate, dibutyl oxalate, diethyl oxalate, diamyl oxalate, dimethyl maleate, diethyl maleate, dipropyl maleate, dioctyl maleate, dilauryl maleate, diethyl maleate, dipropenyl maleate, ethyl adipate, di-butyl adipate, ethoxyethyl adipate, ethyl sebacate, dibutyl sebacate, ethyl succinate, butyl succinate, triethyl citrate, tributyl citrate, butyl tartrate, dibutyl tartrate, diamyl tartrate, dimethyl phthalate, diethyl phthalate, propyl phthalate, dibutyl phthalate, diamyl phthalate, dioctyl phthalate, diisooctyl phthalate, butyl glycol phthalate, diphenyl phthalate, methoxyethyl phthalate, butoxyethyl phthalate, dimethyl cyclohexyl phthalate, methyl phthalyl ethyl glycolate, ethyl phthalyl ethyl glycolate, butyl pthalyl butyl glycolate, methyl salicylate, phenyl salicylate, dioctyl thiodipropionate and dithiobis(isooctyl propionate).

The diorganotin oxide-ester complexes can be prepared by reacting an organotin oxide with an ester under conditions of elevated temperature and for a sufficient period of time to effect complete reaction therebetween. Complete descriptions of the preparation of these reaction products are disclosed in the Johnson and Carroll patents discussed above, the disclosures of which are incorporated herein by reference.

Optional stabilizers

If desired, a bivalent stannous tin salt can be employed with the stabilizer combination of the invention, as disclosed in application Ser. No. 743,972, filed July 11, 1968. The stannous salt contains two groups selected from the group consisting of bromide and chloride and non-nitrogenous organic groups which are the residue of non-nitrogenous organic compounds having an active hydrogen attached to oxygen or sulfur which is replaceable by a metal, specifically tin.

The organic stannous salts which can be employed according to the present invention preferably include stannous salts of carboxylic acids, alcohols, phenols and mercaptides. The stannous salts can also comprise mixtures of anions, e.g., carboxylate and phenolate. The stannous salts enhance the stabilizing effectiveness of the combination of the organotin mercapto acid ester-organotin oxide-ester complex.

The stabilizer combination of this invention can also be used in combination with other known stabilizers, such as phenolic antioxidants, as disclosed in U.S. Pat. No. 3,346,536, organic phosphite esters, as disclosed in U.S. Pat. No. 3,346,536, epoxy compounds as disclosed in U.S. Pat. No. 2,997,454, as well as organometallic compounds such as alkyltin sulfides, such as mono or dibutyltin sulfide and dioctyltin sulfide. Other organometallic stabilizers include polyvalent metal salts of medium and of high molecular weight fatty acids and phenols, with metals such as calcium, tin, cadmium, barium, zinc, magnesium and strontium.

Plasticizers and other additives

The stabilizing compositions of this invention, both with and without supplementary stabilizers, are excellent stabilizers for both plasticized and unplasticized polyvinyl chloride resins but particularly for unplasticized resins. When plasticizers are to be employed, they may be incorporated into the polyvinyl chloride resins in accordance with conventional means. The conventional plasticizers can be used, such as dioctyl phthalate, dioctyl sebacate and tricresyl phosphate or any of the esters mentioned hereinbefore with respect to the organotin oxide-ester complex. The amount of plasticizer employed with the resin is dependent upon the form of resin desired. Thus, rigids are formed employing up to about 10% plasticizer by weight of resin; semi-rigids are formed employing from about 10 to about 18% plasticizer by weight of resin, and plasticized resins are formed employing from about 18 to about 75% plasticizer by weight of resin.

Particularly useful plasticizers are the epoxy higher esters having from about twenty to about one hundred fifty carbon atoms. Such esters will initially have had unsaturation in the alcohol or acid portion of the molecule, which is taken up by the formation of the epoxy group.

A small amount, usually not more than 1.5%, of a parting agent or lubricant, also can be included. Typical parting agents are the higher aliphatic acids, and salts having twelve to twenty-four carbon atoms, such as stearic acid, lauric acid, palmitic acid and myristic acid, lithium stearate and calcium palmitate, mineral lubricating oils, polyvinyl stearate, polyethylene, paraffin wax and montan wax derivatives.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

Polyvinyl chloride resins

The invention is applicable to any polyvinyl chloride resin. The term "polyvinyl chloride" as used herein is inclusive of any polymer formed at least in part of the

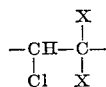

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides such as those disclosed in British Pat. No. 893,288 and also copolymers of vinyl chloride in a major portion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Pat. No. 2,984,593 to Isaksem et al., that is, syndiotactic polyvinyl chloride, as well as atactic and isotactic polyvinyl chlorides.

Proportion of components of stabilizer combinations

The essential components of the stabilizer combination of the invention, the diorganotin mercapto acid ester and the diorganotin oxide-ester complex, are mixed in proportions to provide a tin content which, in the amount of stabilizer combination used, usually from 0.25 to 10%, preferably from 0.5% to 5%, by weight of the resin, is sufficient to impart the desired resistance to development of early discoloration at working temperatures of 350° F. or 375° F. The amount of diorganotin complex that imparts this improvement to the diorganotin mercapto acid ester is determined in each case by trial and error, adding the complex in small amounts, until the effect is obtained. The amount of complex is not in any case so large that the effect is not obtained, at the amount of stabilizer used in the resin.

The diorganotin mercapto acid ester is the principal stabilizer component, and the proportion of this component that is to be used is determined by the desired stabilizing effect characteristic of this component. The tin content of any specific diorganotin mercapto acid ester is of course fixed, and after the desired amount of this component has been established, the tin content of the total composition is adjusted upwardly or downwardly by addition of the appropriate amount of diorganotin oxide-oxygen-containing acid ester complex. The tin content of this complex can be easily adjusted by selecting the proportions of dialkyltin oxide and ester to be reacted. No stoichiometry is required. Thus, a very wide range of tin contents in the stabilizer combination is possible even if one imposes limitations on the specific diorganotin oxide to be used and the particular diorganotin mercapto acid ester to be used.

It is possible to formulate stabilizer combinations containing from about 10 to about 90% diorganotin mercapto acid ester and from about 10 to about 90% diorganotin oxide-oxygen-containing acid ester complex. The amounts of each are always selected to obtain an enhanced resistance to the development of early discoloration when the resin is heated at 350° F. to 375° F. This amount is to some extent dependent on tin content, and to some extent on the proportion of diorganotin mercapto acid ester, and the two are also correlated with the particular compounds of each type that are used. Thus, it may be desirable to maintain a higher proportion of diorganotin mercapto acid ester in some stabilizer systems, as well as a higher tin content, to obtain the enhanced resistance to early discoloration. This can be achieved by combining a relatively small amount of diorganotin oxide-ester of an oxygen containing acid complex, whose tin content is very high with the diorganotin mercapto acid ester. Such high tin containing ester complexes are easily prepared because the amounts of diorganotin oxide and ester employed in forming this complex can be varied considerably. Up to two moles of organotin oxide per mole of ester group will react to form the desired complex. Thus, the diorganotin oxide-ester complex can contain as little as 1% tin, up to about 50% tin, and preferably from about 10 to about 30% tin.

This means that the tin content of the stabilizer combination can be adjusted to contain about 5 to about 45% of tin, preferably from about 10% to about 30% tin. It will be apparent that the stabilizer combination can have a lower or higher tin content than, or the same tin content as, the diorganotin mercapto acid ester. Thus, the tin content in the stabilizer combination can be high or low, and can be controlled within wide ranges without limitation by stoichiometric requirements.

The molar ratio of the tin in the diorganotin oxideester complex to the tin in the diorganotin mercapto acid ester should be within the range of from about 0.05:1 to about 1.5:1, and preferably within the range of from about 0.25:1 to about 1:1.

If a stannous salt is to be added to the stabilizer composition, the amount of stannous tin in the stannous salt can be as little as about 0.5% by weight of the tin in the diorganotin mercapto acid ester. Too high a proportion of stannous salt can decrease effectiveness of the stabilizer combination rather than increase it. The preferred amount of stannous tin is from about 1% to about 8% by weight of the tin in the diorganotin mercapto acid ester.

Proportions of stabilizers in resin

The more rigorous the conditions to which the resin is subjected during working and mixing and the longer the term required for resistance to degradation, the larger the amount of stabilizer required.

Generally as little as 0.25% total of the stabilizer combination by weight of the resin provides sufficient tin to impart some resistance to heat deterioration, and this may be adequate in many cases. There is no critical upper limit on the amount of the stabilizer combination but amounts above about 10% by weight of the resin do not give an increase in stabilizing effectiveness commensurate with the additional stabilizer employed. Preferably, the amount is from about 0.5 to about 5% by weight of the resin.

The stabilizer combination of the invention can be employed together with other polyvinyl chloride resin stabilizers. The stabilizer combination of the invention in this event will be the major stabilizer, and the additional stabilizers will supplement the stabilizing action of the former, the amount of the stabilizer combination being within the range from about 0.25 to about 15 parts by weight per 100 parts of the resin, and the additional stabilizers being in an amount of from about 0.05 to about 10 parts per 100 parts of the resin.

Preparation and processing

Generally, the stabilizer composition of this invention can be prepared by mixing, blending or dissolving the diorganotin mercapto acid ester with the diorganotin oxide-ester complex, to form a homogeneous mixture or the individual components of the composition can be compounded separately into the resin as can other ingredients of the formulation.

The stabilizer combination of the invention can be formulated and marketed as a liquid or solid composition for incorporation in the resin by the resin manufacturer or by the converter. The liquid compositions are homogeneous solutions which are stable and show no tendency to separate on long standing.

The preparation of the polyvinyl chloride resin composition is easily accomplished by conventional procedures. The selected stabilizer combination is compounded with the polyvinyl chloride resin, and other ingredients of the formulation and heated on a two or three roll mill, at a temperature at which the mix is fluid and thorough blending facilitated, milling the resin composition including any plasticizer at from 250 to 375° F. for a time sufficient to form a homogeneous mass, five minutes, usually. After the mass is uniform, it is sheeted off in the usual way.

The following examples relate to the preparation of diorganotin oxide complexes with esters of oxygen-containing acid.

EXAMPLE A

Dibutyltin oxide (39 g.) and diisooctyl phthalate (61 g.) were mixed together and heated at about 190° C., until the dibutyltin oxide dissolved, which required about 3 hours. The homogeneous liquid was then cooled. The dibutyltin oxide-diisooctyl phthalate complex contained 18.6% Sn.

EXAMPLE B

Dibutyltin oxide (249 g.) and diisooctyl phthalate (353 g.) were mixed together and heated at about 190° C., until the dibutyltin oxide dissolved, which required about 3.5 hours. The homogeneous liquid was then cooled. The dibutyltin oxide-diisooctyl phthalate complex contained 19.7% Sn.

EXAMPLE C

Dibutyltin oxide (249 g.) and tridecyl phosphite (542 g.) were mixed together and heated at about 190° C., until the dibutyltin oxide dissolved, which required about 4 hours. The homogeneous liquid was then cooled. The dibutyltin oxide-tridecyl phosphite complex contained 15.0% Sn.

EXAMPLE D

Dibutyltin oxide (24.9 g.) and dithiobis(octylpropionate) (38.9 g.) were mixed together and heated at about 190° C., until the dibutyltin oxide dissolved, which required about 3.5 hours. The homogeneous liquid was then cooled. The dibutyltin oxide-dithiobis(octylpropionate) complex contained 18.6% Sn.

EXAMPLE E

Dibutyltin oxide (56 g.) and dithiobis(isooctylpropionate) (44 g.) made by the oxidation of isooctyl mercapto-priopionate with iodine, were mixed together and heated at about 190° C., until the dibutyltin oxide dissolved, which required about 3 hours. The homogeneous liquid was then cooled. The dibutyltin oxide-dithiobis(isooctyl propionate) complex contained 26.7% Sn.

EXAMPLE F

Dibutyltin oxide (249 g.) and dioctyl maleate (351 g.) were mixed together and heated at about 185° C., until the dibutyltin oxide dissolved, which required about 4 hours. The homogeneous liquid was then cooled. The dibutyltin oxidedioctyl maleate complex contained 19.8% Sn.

EXAMPLE G

Dibutyltin oxide (159 g.) and diisooctyl phthalate (159 g.) were mixed together and heated at about 190° C., until the dibutyltin oxide dissolved, which required about 3.3 hours. The mixture was then cooled and a homogeneous viscous liquid complex was formed. The dibutyltin oxide-diisooctyl phthalate complex contained 23.85% Sn.

EXAMPLE H

Dibutyltin oxide (24.9 g.) and dioctyl thiodipropionate (38.9 g.) were mixed together and heated at about 180° C., until the dibutyltin oxide dissolved, which required about 4 hours. The homogeneous liquid was then cooled. The dibutyltin oxide-dioctyl thiodipropionate complex contained 18.6% Sn.

EXAMPLE J

Dibutyltin oxide (24.9 g.) and dithiobis(diisooctyl acetate) (38.9 g.) were mixed together and heated at about 175° C., until the dibutyltin oxide dissolved, which required about 3.5 hours. Upon cooling, a homogeneous brown liquid complex was formed. The dibutyltin oxide-dithiobis(tridecyl phosphite) complex contained 18.6% Sn.

EXAMPLE K

Dibutyltin oxide (24.9 g.) and isooctyl epoxy tallate (Drapex 4.4) (38.9 g.) were mixed together and heated at about 180° C., until the dibutyltin oxide dissolved, which required about 4 hours. The homogeneous (yellow) liquid was then cooled. The dibutyltin oxide-isooctyl epoxy tallate (Drapex 4.4) complex contained 18.6% Sn.

EXAMPLE L

Dibutyltin oxide (24.9 g.) and tridecyl phosphite (38.9 g.) were mixed together and heated at about 190° C., until the dibutyltin oxide dissolved, which required about 4 hours. The homogeneous liquid was then cooled. The dibutyltin oxide-tridecyl phosphite complex contained 18.6% Sn.

EXAMPLE M

Dibutyltin oxide (24.9 g.) and diethylene glycol dibenzoate (Benzoflex 245) (38.9 g.) were mixed together and heated at about 140° C., until the dibutyltin oxide dissolved, which required about 3 hours. The homogeneous liquid was then cooled. The dibutyltin oxide-diethylene glycol dibenzoate complex contained 18.6% Sn.

EXAMPLE N

Dibutyltin oxide (24.9 g.) and triethylene glycol di-2-ethyl hexoate (Flexol 3-GO) (38.9 g.) were mixed together and heated at about 170° C., until the dibutyltin oxide dissolved, which required about 4 hours. The homogeneous liquid was then cooled. The dibutyltin oxide-triethylene glycol di-2-ethyl hexoate complex contained 18.6% Sn.

EXAMPLE O

Dibutyltin oxide (24.9 g.) and polyethylene glycol di-2-ethyl hexoate (Flexol 4-GO) (38.9 g.) were mixed together and heated at about 185° C., until the dibutyltin oxide dissolved, which required about 3.5 hours. The homogeneous liquid was then cooled. The dibutyltin oxide-polyethylene glycol di-2-ethyl hexoate complex contained 18.6% Sn.

EXAMPLE P

Dibutyltin oxide (99.6 g.) and diisooctyl phthalate (39.0 g.) were mixed together and heated to about 190° C., until the dibutyltin oxide dissolved, which required about 4 hours. The homogeneous liquid was then cooled to room temperature. The dibutyltin oxide-diisooctyl phthalate complex contained about 34.3% Sn and was a solid paste at room temperature.

EXAMPLE Q

Dioctyltin oxide (72.2 g.) and dioctyl phthalate (75.8 g.) were mixed together and heated at about 185° C., until the dioctyltin oxide dissolved, which required about 4 hours. The homogeneous liquid was then cooled. The dioctyltin oxide-dioctyl phthalate complex contained 16.8% Sn.

EXAMPLE R

Dimethyltin oxide (16.5 g.) and diisooctyl phthalate (47.4 g.) were mixed together and heated at about 185° C., until the dimethyltin oxide dissolved, which required about 4 hours. The homogeneous liquid was then cooled. The dimethyltin oxide-diisooctyl phthalate complex contained 18.7% Sn.

EXAMPLE S

Dioctyltin oxide (48 g.) and dioctyl phthalate (52 g.) were mixed together and heated at about 185° C., until the dioctyltin oxide dissolved, which required about 3.5 hours. The homogeneous liquid was then cooled. The dioctyltin oxide-dioctyl phthalate complex contained 15.7% Sn.

EXAMPLE T

Dibutyltin oxide (50 g.) and epoxy soyabean oil (Drapex 6.8) (50 g.) were mixed together and heated at about 185° C., until the dibutyltin oxide dissolved, which required about 4 hours. A homogeneous viscous liquid forms on cooling. The dibutyltin oxide-epoxy soyabean oil complex contained 23.8% Sn.

The following examples relate to the preparation of various stabilizer compositions in accordance with the invention.

EXAMPLE I

Dibutyltin bis(isooctyl thioglycolate) (65 parts) was blended with the dibutyltin oxide-diisooctyl phthalate complex of Example A (35 parts) at 25° C., forming a homogeneous liquid composition which contained about 18.6% Sn, and was useful as a stabilizer composition for polyvinyl chloride resins, capable of lessening the development of early discoloration when heated at 350 to 375° F.

EXAMPLE II

Dibutyltin bis(isooctyl mercaptopropionate) (65 parts) was blended with the dibtuyltin oxide-diisooctyl phthalate complex of Example B (35 parts) at 25° C. forming a homogeneous liquid composition which contained about 18.6% Sn and was useful as a stabilizer composition for polyvinyl chloride resins, capable of lessening the development of early discoloration when heated at 350 to 375° F.

EXAMPLE III

Dibutyltin bis(isooctyl thioglycolate) (65 parts) was blended with the dibutyltin oxide-diisooctyl phthalate complex of Example G (35 parts) by stirring the mixture at 25° C. forming a homogeneous liquid composition which contained about 20.45% Sn and was useful as a stabilizer composition for polyvinyl chloride resins, capable of lessening the development of early discoloration when heated at 350 to 375° F.

EXAMPLE IV

Dibutyltin bis(isooctyl mercaptopropionate) (73 parts) was blended with the dibutyltin oxide-diisoctyl phthalate complex of Example B (27 parts) at 25° C. forming a homogeneous liquid composition which contained about 18.3% Sn and was useful as a stabilizer composition for polyvinyl chloride resins, capable of lessening the development of early discoloration when heated at 350 to 375° F.

EXAMPLE V

Dioctyltin bis(isooctyl thioglycolate) (65 parts) was blended with the dioctyltin oxide-diisooctyl phthalate complex of Example Q (35 parts) at 25° C. forming a homogeneous liquid composition which contained about 16.8% Sn and was useful as a stabilizer composition for polyvinyl chloride resins, capable of lessening the development of early discoloration when heated at 350 to 375° F.

EXAMPLE VI

Dioctyltin bis(isooctyl thioglycolate) (1.4 parts) was blended with the dioctyltin oxide-dioctyl phthalate complex of Example S (0.1 part) at 25° C. forming a homogeneous liquid composition which contained about 15.7% Sn and was useful as a stabilizer composition for polyvinyl chloride resins, capable of lessening the development of early discoloration when heated at 350 to 375° F.

The following examples relate to the preparation and testing of polyvinyl chloride resin compositions containing the stabilizer composition of the invention.

EXAMPLE 1

Rigid polyvinyl chloride resin formulations were prepared having the following composition:

| | Parts by weight |
|---|---|
| Polyvinyl chloride homopolymer (Plaskon 313) | 100 |
| n-Octyldecyl phthalate (Elastex 82P Allied Chemical) | 4.0 |
| Lubricant (Wax E) | 0.2 |
| Stabilizers | (1) |

[1] Noted in Table I below.

The ingredients were blended and the mixture was compounded, then heated on a two-roll mill at 350° F., for 5 minutes, sheeted off, and cut into strips. The strips were placed in an air oven heated to 375° F. and 350° F. and samples removed at fifteen minute intervals and attached to cards. The appearance of the samples on the cards is noted in Table I, below.

TABLE I

| Example | Control A | Amt. | Control B | Amt. | Example 1 | Amt. |
|---|---|---|---|---|---|---|
| Stabilizer composition (parts) | Dibutyltin bis(isooctyl thioglycolate). | 1.0 | Dibutyltin oxide-diisooctyl phthalate complex (Example A). | 1.0 | Dibutyltin bis(isooctyl thioglycolate). Dibutyltin oxide-diisooctyl phthalate complex (Example A). | 0.65 0.35 |
| Time (min.) | Color | | Color | | Color | |
| Temperature, 375° F. | | | | | | |
| Initial | Colorless | | Very pale yellow | | Colorless. | |
| 15 | Yellow | | Orange | | Do. | |
| 30 | do | | Red | | Pale yellow. | |
| 45 | do | | Red | | Yellow. | |
| 60 | Yellow-brown | | Black | | Brown. | |
| Temperature, 350° F. | | | | | | |
| Initial | Colorless | | Colorless | | Colorless. | |
| 15 | Pale yellow | | Dark yellow | | Do. | |
| 30 | Light yellow | | Yellow-orange | | Do. | |
| 45 | Yellow | | Orange | | Do. | |
| 60 | do | | Red-orange | | Very pale yellow. | |
| 75 | do | | Red | | Light yellow. | |
| 90 | do | | Red | | Do. | |
| 105 | do | | Red | | Yellow. | |
| 120 | Dark yellow, brown edges | | Red | | Do. | |

Control A shows that the dibutyltin bis(isooctyl thioglycolate) is an effective heat stabilizer.

Control B shows that dibutyltin oxide-diisooctyl phthalate complex alone is not a very effective stabilizer, inasmuch as the resin turns deep red after heating for 30 and 60 minutes, at 375° F. and 350° F., respectively, and is already considerably discolored after 15 minutes of heating. However, Example 1 clearly indicates that even small amounts of the dibutyltin oxide-diisooctyl phthalate complex enhance the effectiveness of dibutyltin bis(isooctyl thioglycolate) in greatly improving resistance of polyvinyl chloride resin to development of early discoloration at 375° F. and 350° F. After 15 minutes of heating at 375° F., Example 1 remained colorless, whereas Controls A and B were quite yellow. Example 1 was less discolored even after 30 minutes of heating than was Control A after the first 15 minutes of heating.

EXAMPLE 2

Rigid polyvinyl chloride resin formulations were prepared having the following composition:

| | Parts by weight |
|---|---|
| Polyvinyl chloride homopolymer (Plaskon 313) | 100 |
| n-Octyldecyl phthalate (Elastex 82P, Allied Chemical) | 4.0 |
| Lubricant (Wax E) | 0.2 |
| Stabilizers | (¹) |

¹ Noted in Table II, below.

The ingredients were blended and the mixture was compounded, then heated on a two-roll mill at 350° F., for five minutes, sheeted off, and cut into strips. The strips were placed in an air oven heated to 375° F. and 350° F. and samples removed at 15 minute intervals and attached to cards. The appearance of the samples on the cards is noted in Table II, below.

TABLE II

| Example | Control C | Amt. | Control B | Amt. | Example 2 | Amt. |
|---|---|---|---|---|---|---|
| Stabilizer composition | Dibutyltin bis (isooctyl mercaptopropionate). | 1.0 | Dibutyltin oxide-diisooctyl phthalate (Example A). | 1.0 | Dibutyltin bis(isooctyl mercaptopropionate). Dibutyltin oxide-diisooctyl phthalate complex (Example A). | 0.65 0.35 |
| Time (min.) | Color | | Color | | Color | |
| Temperature, 375° F. | | | | | | |
| Initial | Colorless | | Very pale yellow | | Colorless. | |
| 15 | Yellow | | Orange | | Do. | |
| 30 | do | | Red | | Very pale yellow. | |
| 45 | do | | Red | | Yellow. | |
| 60 | Yellow-brown | | Black | | Yellow-brown. | |
| Temperature, 350° F. | | | | | | |
| Initial | Colorless | | Very pale yellow | | Colorless. | |
| 15 | Pale yellow | | Dark yellow | | Do. | |
| 30 | Light yellow | | Yellow-orange | | Do. | |
| 45 | Yellow | | Orange | | Do. | |
| 60 | do | | Red-orange | | Do. | |
| 75 | do | | Red | | Pale yellow. | |
| 90 | do | | Red | | Do. | |
| 105 | do | | Red | | Light yellow. | |
| 120 | Dark yellow, brown edges | | Red | | Do. | |

Example 1, after 45 minutes and 60 minutes respectively of heating at 350° F., was still virtually colorless, whereas Control A was yellow. After 60 minutes of heating at 350° F., Example 1 is only very pale yellow and less discolored than Control A after 15 minutes of heating.

The improvement in resistance to early discoloration is quite apparent.

Control C shows that the dibutyltin bis(isooctyl mercaptopropionate) is an effective heat stabilizer.

Control B shows that dibutyltin oxide-diisooctyl phthalate complex alone is not a very effective stabilizer, inasmuch as the resin turns deep red after heating for 30 and 60 minutes, at 375° F. and 350° F., respectively, and is already considerably discolored after 15 minutes of heating. However, Example 2 clearly indicates that even small amounts of the dibutyltin oxide-diisooctyl phthalate complex enhance the effectiveness of dibutyltin bis(isooctyl mercaptopropionate) in greatly improving resistance of polyvinyl chloride resin to development of early discoloration at 375° F. and 350° F. After 15 minutes of heating at 375° F., Example 2 remained colorless, whereas Controls C and B are quite yellow. Example 2 was less discolored even after 30 minutes of heating than was Control C after the first 15 minutes of heating.

Example 1, after 45 minutes and 60 minutes, respectively, of heating at 350° F., is still virtually colorless, whereas Control C is yellow.

The improvement in resistance to discoloration is quite apparent.

attached to cards. The appearance of the samples on the cards is noted in Table III, below.

TABLE III

| Example | Control D | Amt. | Control E | Amt. | Example 3 | Amt. |
|---|---|---|---|---|---|---|
| Stabilizer composition | Dibutyltin bis(isooctyl thioglycolate). | 2.0 | Dibutyltin oxide-diisooctyl phthalate complex (Example A). | 2.0 | Dibutyltin bis(isooctyl thioglycolate). Dibutyltin oxide-diisooctyl phthalate (Example A). | 1.3 0.7 |
| Time (min.) | Color | | Color | | Color | |
| Temperature, 375° F. | | | | | | |
| Initial | Colorless | | Very pale yellow | | Colorless. | |
| 15 | Yellow | | Orange | | Do. | |
| 30 | do | | Orange-red | | Very pale yellow. | |
| 45 | do | | Red | | Pale yellow. | |
| 60 | do | | Black | | Yellow. | |
| 75 | Yellow-brown edges | | | | Yellow-brown edges. | |
| 90 | Reddish-brown | | | | Reddish-brown. | |
| 105 | Dark brown | | | | Dark brown. | |
| Temperature, 350° F. | | | | | | |
| Initial | Colorless | | Very pale yellow | | Colorless. | |
| 15 | Very pale yellow | | Light orange | | Do. | |
| 30 | Pale yellow | | do | | Do. | |
| 45 | do | | Orange | | Do. | |
| 60 | do | | do | | Very pale yellow. | |
| 75 | Yellow | | do | | Do. | |
| 90 | do | | Orange-red | | Pale yellow. | |
| 105 | do | | do | | Do. | |
| 120 | do | | Red-orange | | Do. | |

It is evident from the above results that the combination of dibutyltin bis(isooctyl thioglycolate) and dibutyltin oxide-diisooctyl phthalate complex greatly improved the resistance to development of early discoloration at 375° F. and 350° F. of polyvinyl chloride resins (Diamond 40). The results of Table III show that the dibutyltin oxide-diisooctyl phthalate complex enhances the effectiveness of the dibutyltin bis(isooctyl thioglycolate) in inhibiting development of early discoloration.

EXAMPLE 3

Rigid or nonplasticized polyvinyl chloride resin formulations were prepared having the following composition:

Parts by weight
Polyvinyl chloride homopolymer (Diamond 40) ___ 100
Acrylonitrile-butadiene-styrene copolymer, impact modifier (Blendex 401) _____ 10
Lubricant (Wax E) _____ 0.25
Stabilizers _____ (¹)

¹ Noted in Table III, below.

EXAMPLE 4

Rigid or non-plasticized polyvinyl chloride resin formulations were prepared having the following composition:

Parts by weight
Polyvinyl chloride homopolymer (Solvic 229) ____ 100
Lubricant (Wax E) _____ 0.25
Stabilizers, noted in Table IV, below.

The stabilizer combination was blended with the resin and lubricant and then heated on a two-roll mill at 350° F., for five minutes, sheeted off, and cut into strips. The strips were placed in an air oven heated to 375° F. and samples removed at 15 minute intervals and attached to cards. The appearance of the samples on the cards is noted in Table IV below.

TABLE IV

| Example | Control F | Amt. | Control G | Amt. | Example 4 | Amt |
|---|---|---|---|---|---|---|
| Stabilizer composition | Dioctyltin bis(isooctyl thioglycolate). | 1.5 | Dioctyltin oxide-dioctyl phthalate complex (Example S). | 1.5 | Dioctyltin bis(isooctyl thioglycolate). Dioctyltin oxide-dioctyl phthalate (Example S). | 1.4 0.1 |
| Time (min.) | Color | | Color | | Color | |
| Temperature, 375° F. | | | | | | |
| Initial | Colorless | | Very pale yellow | | Colorless. | |
| 15 | Light yellow | | Orange | | Do. | |
| 30 | Yellow | | Red | | Very pale yellow. | |
| 45 | Orange brown | | Red | | Yellow, brown edges. | |
| 60 | Dark brown | | Dark red | | Dark brown. | |

The ingredients were blended and the mixture was compounded, then heated on a two-roll mill at 350° F., for 5 minutes, sheeted off, and cut into strips. The strips were placed in air ovens heated to 375° F. and 350° F. and samples removed at fifteen minute intervals and It is evident from the above results that the combination of dioctyltin oxide-dioctyl phthalate complex and dioctyltin bis(isooctyl thioglycolate) greatly improved the resistance to development of early discolororation at 375° F. of polyvinyl chloride resins (Solvic 229).

EXAMPLE 5

Rigid polyvinyl chloride resin formulations were prepared having the following composition:

| | Parts by weight |
|---|---|
| Polyvinyl chloride homopolymer (Diamond 40) | 100 |
| Acrylonitrile-butadiene-styrene copolymer, impact modifier (Blendex 401) | 10 |
| Lubricant (Wax E) | 0.25 |
| Stabilizer | (1) |

[1] Noted in Table V below.

The ingredients were blended and the mixture was compounded, then heated on a two-roll mill at 350° F. for five minutes, sheeted off, and cut into strips The strips were placed in an air oven, heated to 375° F. and samples removed at fifteen minute intervals and affixed to a card. The appearance of the samples on the card is noted in Table V below.

EXAMPLE 6

Rigid polyvinyl chloride resin formulations were prepared having the following composition:

| | Parts by weight |
|---|---|
| Polyvinyl chloride homopolymer (Diamond 40) | 100 |
| Acrylonitrile-butadiene - styrene copolymer, impact modifier (Blendex 401) | 10 |
| Lubricant (Wax E) | 0.25 |
| Stabilizers | (1) |

[1] Noted in Table VI below.

The ingredients were blended and the mixture was compounded, then heated on a two-roll mill at 350° F. for five minutes, sheeted off and cut into strips. The strips were placed in an air oven, heated to 375° F. and samples removed at fifteen minute intervals and affixed to a card. The appearance of the samples on the card is noted in Table VI below.

TABLE V
[375° F.]

| Example | Control H | Parts | Control J | Parts | Example 5 | Parts |
|---|---|---|---|---|---|---|
| Stabilizer composition | Dibutyltin bis-(isooctyl thioglycolate). | 2.0 | Dibutyltin oxide-diisoocty phthalate complex (Example G). | 2.0 | Dibutyltin bis (isooctyl thioglycolate). | 1.17 |
| | | | | | Dibutyltin oxide-diisooctyl phthalate complex (Example G). | 0.63 |
| Time (min.) | Color | | Color | | Color | |
| Initial | Colorless | | Very pale yellow | | Colorless. | |
| 15 | Yellow | | Orange | | Do. | |
| 30 | do | | Orange-red | | Very pale yellow. | |
| 45 | do | | Red | | Pale yellow. | |
| 60 | Yellow, slight brown edge | | Black | | Yellow. | |
| 75 | Yellow-brown | | | | Yellow-brown. | |
| 90 | Dark brown | | | | Dark brown. | |

The results in Table V show that 1.8 parts of the stabilizer combination of the invention, namely, dibutyltin bis(isooctyl thioglycolate) (1.17 parts) and dibutyltin oxide-diisooctyl phthalate complex (0.63), is superior in inhibiting development of early discoloration of polyvinyl chloride resin upon heating at 375° F. than larger amounts of the individual components thereof, namely, 2.0 parts of dibutyltin bis(isooctyl thioglycolate) alone (Control H) and 2.0 parts of dibutyltin oxide-diisooctyl phthalate complex alone (Control J).

TABLE VI
[375° F.]

| Example | Control H | Parts | Control 6 | Parts | Example 5 | Parts |
|---|---|---|---|---|---|---|
| Stabilizer composition | Dibutyltin bis-(isooctyl thioglycolate). | 2.0 | Dibutyltin oxide-diisooctyl phthalate complex (Example P). | 2.0 | Dibutyltin bis (isooctyl thioglycolate). | 1.2 |
| | | | | | Dibutyltin oxide-diisooctyl phthalate complex (Example P). | 0.4 |
| Time (min.) | Color | | Color | | Color | |
| Initial | Colorless | | Very pale yellow | | Colorless. | |
| 15 | Yellow | | Orange | | Do. | |
| 30 | do | | Orange red | | Pale yellow. | |
| 45 | do | | Red | | Yellow. | |
| 60 | Yellow, slight brown edges | | Black | | Yellow, slight brown edges. | |
| 75 | Yellow-brown | | | | Reddish-brown. | |
| 90 | Dark brown | | | | Dark brown. | |

The results in Table VI show that 1.6 parts of the stabilizer combination of the invention, namely, dibutyltin bis(isooctyl thioglycolate) (1.2 parts) and dibutyltin oxide-diisooctyl phthalate complex (0.4), is superior in inhibiting development of early discoloration of polyvinyl chloride resin upon heating at 375° F. than larger amounts of the individual components thereof, namely, 2.0 parts of dibutyltin bis(isooctyl thioglycolate) alone (Control H) and 2.0 parts of dibutyltin oxide-diisooctyl phthalate complex alone (Control J).

EXAMPLE 7

Rigid polyvinyl chloride resin formulations were prepared having the following composition:

| | Parts by weight |
|---|---|
| Polyvinyl chloride homopolymer (Diamond 40) | 100 |
| Acrylonitrile-butadiene - styrene copolymer, impact modifier (Blendex 401) | 10 |
| Lubricant (Wax E) | 0.25 |
| Stabilizers | (¹) |

¹ Noted in Table VII below.

The ingredients were blended and the mixture was compounded, then heated on a two-roll mill at 350° F., for five minutes, sheeted off, and cut into strips. The strips were placed in an air oven heated to 375° F. and 350° F. and samples removed at fifteen minute intervals and attached to cards. The appearance of the samples on the cards is noted in Table VII, below.

EXAMPLE 8

Rigid polyvinyl chloride resin formulations were prepared having the following composition:

| | Parts by weight |
|---|---|
| Polyvinyl chloride homopolymer (Diamond 40) | 100 |
| Acrylonitrile-butadiene-styrene copolymer, impact modifier (Blendex 401) | 10 |
| Lubricant (Wax E) | 0.25 |
| Stabilizers | ¹ |

¹ Noted in Table VII, below.

The ingredients were blended and the mixture was compounded, then heated on a two-roll mill at 350° F., for five minutes, sheeted off, and cut into strips. The strips were placed in an air oven heated to 375° F. and samples removed at 15 minute intervals.

TABLE VIII
[375° F.]

| Example | Control M | Parts | Control N | Parts | Example 8 | Parts |
|---|---|---|---|---|---|---|
| Stabilizer composition | Dimethyltin oxide-dioctyl phthalate complex (Example R). | 2.0 | Dibutyltin bis (isooctyl thioglycolate). | 2.0 | Dibutyltin bis(isooctyl thioglycolate). Dimethyltin oxide-dioctyl phthalate (Example R). | 1.3 0.7 |
| Time (min.) | Color | | Color | | Color | |
| Initial | Severe discoloration within 30 minutes. | | Colorless | | Colorless. | |
| 15 | | | Yellow | | Very pale yellow. | |
| 30 | | | do | | Pale yellow. | |
| 45 | | | do | | Do. | |
| 60 | | | Yellow-brown edge | | Do. | |
| 75 | | | Yellow-brown | | Yellow-brown. | |
| 90 | | | Brown | | Brown. | |

The results in Table VIII clearly indicate that the combination of dimethyltin oxide-dioctyl phthalate complex and dibutyltin bis(isooctyl thioglycolate) was effective in improving resistance of polyvinyl chloride resin to discoloration.

TABLE VII

| Example | Control K | Parts | Control L | Parts | Example 7 | Parts |
|---|---|---|---|---|---|---|
| Stabilizer composition | Dioctyltin bis (isooctyl thioglycolate). | 2.0 | Dioctyltin oxide-diisooctyl phthalate complex (Example Q.) | 2.0 | Dioctyltin bis(isooctyl thioglycolate). Dioctyltin oxide-diisooctyl phthalate complex (Example Q). | 1.3 0.7 |
| Time (min.) | Color | | Color | | Color | |
| | | | Temperature, 375° F. | | | |
| Initial | Colorless | | Very pale yellow | | Colorless. | |
| 15 | Yellow | | Orange | | Very pale yellow. | |
| 30 | do | | do | | Pale yellow. | |
| 45 | do | | Red | | Yellow. | |
| 60 | Yellow, slight brown edge | | Black | | Yellow, slight brown edge. | |
| 75 | Reddish-brown | | | | Reddish-brown. | |
| 90 | Brown | | | | Brown. | |
| | | | Temperature, 350° C. | | | |
| Initial | Colorless | | Very pale yellow | | Colorless. | |
| 15 | do | | Light orange | | Do. | |
| 30 | Pale yellow | | do | | Very pale yellow. | |
| 45 | Light yellow | | Orange | | Do. | |
| 60 | do | | do | | Do. | |
| 75 | do | | Orange-red | | Do. | |
| 90 | Yellow | | do | | Pale yellow. | |
| 105 | do | | Red-orange | | Do. | |
| 120 | do | | | | Do. | |

The results in Table VII clearly show the improved effectiveness obtained by the stabilizer combination of the invention (taken at 2.0 parts per 100 parts resin) over corresponding amounts of the dioctyltin bis(isooctyl thioglycolate) alone. It is clearly seen that the dioctyltin oxide-diisooctyl phthalate complex enhances the effectiveness of the dioctyltin bis (isooctyl thioglycolate) in inhibiting development of early discoloration of the resin.

EXAMPLES 9–16

Polyvinyl chloride resin compositions were stabilized with combinations of dibutyltin bis (isooctyl thioglycolate) and dibutyltin oxide reaction products of esters of various oxygen containing acids according to the invention.

Rigid or non-plasticized polyvinyl chloride resin formulations were prepared containing 100 parts of a vinyl chloride homopolymer (Diamond 40), 10 parts impact modifier (Blendex 401, that is, acrylonitrile-butadiene-styrene copolymer) 0.25 part lubricant (Wax E) and the stabilizers noted in Tables IX-A and IX-B.

The ingredients were blended and compounded and then heated on a two-roll mill at 350° F., for five minutes, sheeted off and cut into strips. The strips were placed in an air oven, heated to 375° F. or 350° F. and samples removed at 15 minute intervals and affixed to cards to show the progressive heat deterioration. The appearance of the samples on the cards is noted in Tables IX-A and IX-B below.

TABLE IX-A
[375° F.]

| Example | Control M | Amt. | Example 9 | Amt. | Example 10 | Amt. | Example 11 | Amt. | Example 12 | Amt. |
|---|---|---|---|---|---|---|---|---|---|---|
| Stabilizer composition | Dibutyltin bis (isooctyl thioglycolate). | 2.0 | Dibutyltin bis (isooctyl thioglycolate). Dibutyltin oxide-tridecyl phosphite complex (Example L). | 1.3 / 0.7 | Dibutyltin bis (isooctyl thioglycolate). Dibutyltin oxide-diethylene glycol dibenzoate complex (Example M). | 1.3 / 0.7 | Dibutyltin bis (isooctyl thioglycolate). Dibutyltin oxide-triethylene glycol di-2-ethyl hexoate complex (Example N). | 1.3 / 0.7 | Dibutyltin bis (isooctyl thioglycolate). Dibutyltin oxide-polyethylene glycol di-2-ethyl hexoate complex (Example O). | 1.3 / 0.7 |

| Time (min.) | Color | Color | Color | Color | Color |
|---|---|---|---|---|---|
| Initial | Colorless | Colorless | Colorless | Colorless | Colorless. |
| 15 | Yellow | Very pale yellow | Very pale yellow | Very pale yellow | Very pale yellow. |
| 30 | do | Pale yellow | Pale yellow | Pale yellow | Pale yellow. |
| 45 | do | Yellow | Yellow | Yellow | Yellow. |
| 60 | Yellow-brown edge | Yellow-brown edge | Yellow-brown edge | Yellow-brown edge | Yellow-brown edge. |
| 75 | Yellow-brown | Yellow-brown | Yellow-brown | Yellow-brown | Yellow-brown. |
| 90 | Brown | Brown | Brown | Brown | Brown. |

| Example | Example 13 | Amt. | Example 14 | Amt. | Example 15 | Amt. | Example 16 | Amt. |
|---|---|---|---|---|---|---|---|---|
| Stabilizer composition | Dibutyltin bis (isooctyl thioglycolate). Dibutyltin oxide-dioctyl thiodipropionate complex (Example H). | 1.0 / 1.0 | Dibutyltin bis (isooctyl thioglycolate). Dibutyltin oxide-dithiobis (octyl propionate) complex (Example D). | 1.0 / 1.0 | Dibutyltin bis (isooctyl thioglycolate). Dibutyltin oxide-dithiobis (diisooctyl acetate) complex (Example J). | 1.0 / 1.0 | Dibutyltin bis (isooctyl thioglycolate). Dibutyltin oxide-isooctyl epoxy tallate complex (Example T). | 1.0 / 1.0 |

| Time (min.) | Color | Color | Color | Color |
|---|---|---|---|---|
| Initial | Colorless | Colorless | Colorless | Colorless. |
| 15 | do | Colorless | do | Do. |
| 30 | Pale yellow | Pale yellow | Pale yellow | Pale yellow. |
| 45 | Light yellow | Light yellow | Light yellow | Light yellow. |
| 60 | Yellow | Yellow | Yellow | Yellow. |
| 75 | Yellow-brown | Yellow-brown | Yellow-brown | Yellow-brown. |
| 90 | Brown | Brown | Brown | Brown. |

TABLE IX-B
[350° F.]

| Example | Control M | Amt. | Example 9 | Amt. | Example 10 | Amt. | Example 11 | Amt. | Example 12 | Amt. |
|---|---|---|---|---|---|---|---|---|---|---|
| Stabilizer composition | Dibutyltin bis (isooctyl thioglycolate). | 2.0 | Dibutyltin bis (isooctyl thioglycolate). Dibutyltin oxide-tridecyl phosphite complex (Example L). | 1.3 / 0.7 | Dibutyltin bis (isooctyl thioglycolate). Dibutyltin oxide-diethylene glycol dibenzoate complex (Example M.) | 1.3 / 0.7 | Dibutyltin bis (isooctyl thioglycolate). Dibutyltin oxide-triethylene glycol di-2-ethyl hexoate complex (Example N). | 1.3 / 0.7 | Dibutyltin bis (isooctyl thioglycolate). Dibutyltin oxide-polyethylene glycol di-2-ethyl hexoate complex (Example 0). | 1.3 / 0.7 |

| Time (min.) | Color | Color | Color | Color | Color |
|---|---|---|---|---|---|
| Initial | Colorless | Colorless | Colorless | Colorless | Colorless. |
| 15 | Very pale yellow | do | do | do | Do. |
| 30 | Pale yellow | do | do | do | Do. |
| 45 | Yellow | do | do | do | Do. |
| 60 | do | Very pale yellow | Very pale yellow | Very pale yellow | Very pale yellow. |
| 75 | do | do | do | do | Do. |
| 90 | do | Pale yellow | Pale yellow | Pale yellow | Pale yellow. |
| 105 | do | do | do | do | Do. |
| 120 | do | Yellow | Yellow | Yellow | Yellow. |

TABLE IX-B—Continued

| Example | Example 13 | Amt. | Example 14 | Amt. | Example 15 | Amt. | Example 16 | Amt. |
|---|---|---|---|---|---|---|---|---|
| Stabilizer composition | Dibutyltin bis (isooctyl thioglycolate). Dibutyltin oxide-dioctyl thiodipropionate complex (Example H). | 1.0 1.0 | Dibutyltin bis (isooctyl thioglycolate). Dibutyltin oxide-dithiobis (octyl propionate) complex (Example D). | 1.0 1.0 | Dibutyltin bis (isooctyl thioglycolate). Dibutyltin oxide-dithiobis (diisooctyl acetate) complex (Example J). | 1.0 1.0 | Dibutyltin bis (isooctyl thioglycolate). Dibutyltin oxide-isooctyl epoxy tallate complex (Example T). | 1.0 1.0 |
| Time (min.) | Color | | Color | | Color | | Color | |
| Initial | Colorless | | Colorless | | Colorless | | Colorless. | |
| 15 | do | | do | | do | | Do. | |
| 30 | do | | do | | do | | Do. | |
| 45 | do | | do | | do | | Do. | |
| 60 | do | | do | | do | | Do. | |
| 75 | Very pale yellow | | Very pale yellow | | Very pale yellow | | Very pale yellow. | |
| 90 | do | | do | | do | | Do. | |
| 105 | Pale yellow | | Pale yellow | | Pale yellow | | Pale yellow. | |
| 120 | Light yellow | | Light yellow | | Light yellow | | Light yellow. | |

It is evident from the above results that the combinations of dibutyltin bis(isooctyl thioglycolate) and the dibutyltin oxide-ester complexes greatly improved the resistance to development of early discoloration at 375° F. and 350° F. of polyvinyl chloride resin (Diamond 40). The results of Tables IX-A and IX-B clearly show that the complexes enhance the effectiveness of the dibutyltin bis(isooctyl thioglycolate) in inhibiting development of early discoloration. This is especially surprising inasmuch as polyvinyl chloride resin containing only the complexes was severely discolored after heating at 350° F. and 375° F. for 30 minutes or less.

EXAMPLES 17–20

To demonstrate that the stabilizer combinations of this invention are useful with other vinyl chloride resins, the following experiments were conducted.

Rigid or non-plasticized polyvinyl chloride resin formulations were prepared containing 100 parts of a vinyl chloride polymer as indicated below, 10 parts impact modifier (Blendex 401, that is, acrylonitrile-butadiene-styrene copolymer), 0.25 part lubricant (Wax E) and 2.0 parts of stabilizer composition as noted in Table X below. The vinyl chloride resins employed in these examples were as follows:

Example—
17—Polyvinyl chloride homopolymer (Opalon 630)
18—Polyvinyl chloride homopolymer (Plaskon SR 415)
19—Polyvinyl chloride medium molecular weight homopolymer (Ethyl SM 185)
20—Propylene modified vinyl chloride copolymer (Cumberland 405)

The ingredients were compounded, then fused on a two-roll mill at 350° F. for five minutes, sheeted off and cut into strips and oven aged at 375° F. and 350° F. with samples removed every fifteen minutes. The results are indicated in Table X. (All samples had equivalent tin contents.)

TABLE X
[375° F.]

| Example | Control N | Amt. | Control O | Amt. | Example 17 | Amt. | Control P | Amt. | Example 18 | Amt. | Control Q | Amt. | Example 18 | Amt. |
|---|---|---|---|---|---|---|---|---|---|---|---|---|---|---|
| Stabilizer composition | Dibutyltin bis (isooctyl thioglycolate). | 2.2 | Dibutyltin oxide diisooctyl phthalate complex. | 2.2 | Dibutyltin bis (isooctyl thioglycolate). Dibutyltin oxidediisooctyl phthalate complex (Example A). | 1.3 0.7 | Dibutyltin bis (isooctyl thioglycolate). | 2.0 | Dibutyltin bis (isooctyl thioglycolate). Dibutyltin oxidediisooctyl phthalate complex (Example A). | 1.3 0.7 | Dibutyltin oxide diisooctyl phthalate complex. | 2.2 | Dibutyltin bis (isooctyl thioglycolate). Dibutyltin oxide diisooctyl phthalate complex (Example A). | 2.2 |
| Resin | Opalon 630 | | Opalon 630 | | Opalon 630 | | Plaskon SR | | Plaskon SR | | Plaskon SR | | Plaskon SR | |
| Time (min.) | Color | | Color | | Color | | Color | | Color | | Color | | Color | |
| Initial | Colorless | | Severely discolored within 30 minutes. | | Colorless | | Colorless | | Colorless | | Severely discolored within 30 minutes. | | Colorless. | |
| 15 | Yellow | | | | do | | Yellow | | do | | | | Do. | |
| 30 | do | | | | Pale yellow | | do | | Pale yellow | | | | Do. | |
| 45 | do | | | | Light yellow | | do | | Light yellow | | | | Pale yellow. | |
| 60 | do | | | | Yellow | | do | | Yellow | | | | Light yellow. | |
| 75 | Yellow-brown edges | | | | Yellow-brown | | Yellow-brown edges | | Yellow-brown | | | | Yellow-brown edges. | |
| 90 | Brown | | | | Brown | | Brown | | Brown | | | | Brown. | |

3,640,953

TABLE X—Continued

| Example | Control R | Amt. | Example 19 | Amt. | Control S | Amt. | Control T | Amt. | Example 20 | Amt. | Control U | Amt. |
|---|---|---|---|---|---|---|---|---|---|---|---|---|
| Stabilizer composition | Dibutyltin bis (isooctyl thioglycolate). | 2.2 | Dibutyltin bis (isooctyl thioglycolate). Dibutyltin oxide-diisooctyl phthalate complex (Example A). | 1.3 0.7 | Dibutyltin oxide diisooctyl phthalate complex. | 2.2 | Dibutyltin bis (isooctyl thioglycolate). | 2.2 | Dibutyltin bis (isooctyl thioglycolate). Dibutyltin oxide-diisooctyl phthalate complex (Example A). | 1.3 0.7 | Dibutyltin oxide diisooctyl phthalate complex. | 2.2 |
| Resin | Ethyl SM 185 | | Ethyl SM 185 | | Ethyl SM 185 | | Cumberland 405 | | Cumberland 405 | | Cumberland 405 | |
| Time (mins.) | Color | | Color | | Color | | Color | | Color | | Color | |
| Initial | Colorless | | Colorless | | Severely discolored within 30 minutes. | | Colorless | | Colorless | | Severely discolored within 30 minutes. | |
| 15 | Yellow | | do | | | | Yellow | | Do. | | | |
| 30 | do | | Very pale yellow | | | | do | | Very pale yellow. | | | |
| 45 | do | | Yellow | | | | do | | Yellow. | | | |
| 60 | Yellow-red | | Dark yellow | | | | Yellow-red edge | | Yellow-red edge. | | | |
| 75 | Red-brown | | Red-brown | | | | Red-brown | | Red-brown. | | | |

EXAMPLES 21–22

The results clearly indicate the improved effectiveness obtained with the blend of dibutyltin bis(isooctyl thioglycolate) and dibutyltin oxide-diisooctyl phthalate complex in improving resistance of various polyvinyl chloride homopolymers and copolymers to discoloration and especially to development of early discoloration. The results of Table X clearly show that the dibutyltin oxide-diisooctyl phthalate complex enhances the effectiveness of the dibutyltin bis(isooctyl thioglycolate) in inhibiting development of early discoloration.

EXAMPLES 21–22

To show that the stabilizer combination of the invention is effective in rigid polyvinyl chloride resin compositions having different impact modifiers, the following experiments were conducted, in addition to the previous ones where Blendex 401 was used exclusively.

A series of rigid polyvinyl chloride resin formulations were prepared containing 100 parts resin (Diamond 40), 0.25 part lubricant (Wax E), 2.0 or 2.2 parts dibutyltin bis(isooctyl thioglycolate) as control, and impact modifier, namely, Kane Ace B–12 (butadiene graft copolymerized with styrene-methyl methacrylate and acrylonitrile), and KM 228 (acrylic polymer).

The ingredients were blended and the mixture was compounded, then heated on a two-roll mill at 350° F., for 5 minutes, sheeted off, and cut into strips. The strips were placed in an air oven heated to 375° F. and 350° F. and samples removed at fifteen minute intervals and attached to cards. The appearance of the samples on the cards is noted in Table XI below.

TABLE XI
[375° F.]

| Example | Control V | Amt. | Example 21 | Amt. | Control W | Amt. | Example 22 | Amt. |
|---|---|---|---|---|---|---|---|---|
| Stabilizer composition | Dibutyltin bis(isooctyl thioglycolate). | 2.2 | Dibutyltin bis (isooctyl thioglycolate). Dibutyltin oxide-diisooctyl phthalate complex (Example A). | 2.2 | Dibutyltin bis(isooctyl thioglycolate). | 1.3 0.7 | Dibutyltin bis (isooctyl thioglycolate). Dibutyltin oxide-diisooctyl phthalate complex (Example A). | 1.3 0.7 |
| Impact modifier, 10 pts. | Kane Ace B–12 | | Kane Ace B–12 | | KM 228 | | KM 228 | |
| Time (min.) | Color | | Color | | Color | | Color | |
| Initial | Colorless | | Colorless | | Colorless | | Colorless. | |
| 15 | Yellow | | do | | Yellow | | Do. | |
| 30 | do | | Very pale yellow | | do | | Very pale yellow. | |
| 45 | do | | Pale yellow | | do | | Pale yellow. | |
| 60 | do | | Light yellow | | Yellow-brown edges | | Light yellow-brown edges. | |
| 75 | Yellow-brown edges | | Yellow-brown edges | | Yellow-brown | | Yellow-brown edges. | |
| 90 | Brown | | Brown | | Brown | | Brown. | |

Resin compositions containing the dibutyltin oxide-diisooctyl phthalate complex alone were severely discolored after heating at 375° F. for 30 minutes.

EXAMPLE 23

The following example was carried out to demonstrate the importance of selecting the proper ratios of diorganotin mercapto acid ester to diorganotin oxide-ester complex to give the best results, and that not all ratios of the two components give improved stabilization even when the total tin content is kept constant.

A series of rigid or nonplasticized polyvinyl chloride resin compositions containing the dibutyltin oxide-diisooctyl phthalate complex alone were severely discolored after heating at 375° F. for 30 minutes.

The results clearly indicate the improved effectiveness obtained by the mixture of dibutyltin bis(isooctyl thioglycolate) and dibutyltin oxide-diisooctyl phthalate complex over the dibutyltin bis(isooctyl thioglycolate) in improving resistance to discoloration and especially to development of early discoloration of polyvinyl chloride homopolymer with various impact modifiers.

were placed in an air oven heated to 375° F. and 350° F. and samples removed at fifteen minute intervals and attached to cards. The appearance of the samples on the cards is noted in Table XII, below.

TABLE XII
[375° F.]

| Example | Control H | Amt. | Example 23A | Amt. | Example 23B | Amt. | Example 23C | Amt. | Control X | Amt. |
|---|---|---|---|---|---|---|---|---|---|---|
| Stabilizer composition | Dibutyltin bis-(isooctyl thioglycolate). | | Dibutyltin bis-(isooctyl thioglycolate). Dibutyltin oxide-dioctyl maleate complex (Example F). | 2.0 | Dibutyltin bis-(isooctyl thioglycolate). Dibutyltin oxide-dioctyl maleate complex (Example F). | 1.5 0.47 | Dibutyltin bis-(isooctyl thioglycolate). Dibutyltin oxide-dioctyl maleate complex (Example F). | 1.0 0.94 | Dibutyltin oxide-dioctyl maleate complex (Example F). | 1.88 |

| Time (min.) | Color | Color | Color | Color | Color |
|---|---|---|---|---|---|
| Initial | Colorless | Colorless | Colorless | Colorless | Colorless. |
| 15 | Light yellow | Very pale yellow | do | Very pale yellow | Dark yellow. |
| 30 | Yellow | Pale yellow | Very pale yellow | Light yellow | Orange. |
| 45 | do | Light yellow | Light yellow | Light orange | Dark orange-brown. |
| 60 | do | Yellow | Yellow | Orange | Red-brown. |
| 75 | do | Yellow-brown edges | Yellow-brown edges | Dark orange-brown | Brown. |
| 90 | Yellow-brown edges | Brown | Brown | Brown | |
| 105 | Brown | | | | |

[350° F.]

| Example | Control H | Amt. | Example 23A | Amt. | Example 23B | Amt. | Example 23C | Amt. | Control X | Amt. |
|---|---|---|---|---|---|---|---|---|---|---|
| Stabilizer composition | Dibutyltin bis-(isooctyl thioglycolate). | | Dibutyltin bis-(isooctyl thioglycolate). Dibutyltin oxide-dioctyl maleate complex (Example F). | 2.0 | Dibutyltin bis-(isooctyl thioglycolate). Dibutyltin oxide-dioctyl maleate complex (Example F). | 1.5 0.47 | Dibutyltin bis-(isooctyl thioglycolate). Dibutyltin oxide-dioctyl maleate complex (Example F). | 1.0 0.94 | Dibutyltin oxide-dioctyl maleate complex (Example F). | 1.88 |

| Time (min.) | Color | Color | Color | Color | Color |
|---|---|---|---|---|---|
| Initial | Colorless | Colorless | Colorless | Colorless | Colorless. |
| 15 | do | do | do | do | Yellow. |
| 30 | do | do | do | do | Do. |
| 45 | do | Very pale yellow | Very pale yellow | Very pale yellow | Dark yellow. |
| 60 | do | do | do | do | Yellow-orange. |
| 75 | Very pale yellow | Pale yellow | Pale yellow | Pale yellow | Do. |
| 90 | do | Light yellow | Yellow | Yellow | Orange. |
| 105 | do | do | Light yellow | do | Do. |
| 120 | do | do | do | Dark yellow | Do. | resin formulations were prepared having the following composition:

| | Parts by weight |
|---|---|
| Polyvinyl chloride homopolymer (Diamond 40) | 100 |
| Acrylonitrile-butadiene-styrene copolymer, impact modifier (Blendex 401) | 10 |
| Lubricant (Wax E) | 0.25 |
| Stabilizers | (¹) |

¹ As noted in Table XII.

The ingredients were blended and the mixture was compounded, then heated on a two-roll mill at 350° F., for 5 minutes, sheeted off, and cut into strips. The strips The results of Table XII indicate that not all ratios of diorganotin mercaptoacid ester to diorganotin oxide-ester complex are beneficial. When the ratio of diorganotin oxide-ester complex to diorganotin mercaptoacid ester is within the range of about 1:3 to 1:1 at the given total tin level of 0.372 g. tin per 100 parts resin, the stabilizing effectiveness of the combination is quite superior to either component alone. However, when this ratio is increased to about 3:1, the length of heat stability suffers as compared to the controls, although there is still some improved initial color.

EXAMPLE 24

Furthermore, a series of rigid or nonplasticized polyvinyl chloride resin formulations were prepared having the following composition:

| | Parts by weight |
|---|---|
| Polyvinyl chloride homopolymer (Diamond 40) | 100 |
| Acrylonitrile-butadiene-styrene copolymer, impact modifier (Blendex 401) | 10 |
| Lubricant (Wax E) | 0.25 |
| Stabilizers: | |
|    Dibutyltin bis(isooctyl thioglycolate) (18.6% Sn) | 3.0 to 0 |
|    Example A (containing 18.6% Sn) | 0 to 3.0 |

The ingredients were first blended and then compounded on a two-roll mill at 350° F., for five minutes, sheeted off, and cut into strips. The strips were placed in an air oven heated to 375° F. and samples removed at 15 minute intervals.

The attached figure is a bar graph of time in minutes (at 15 minute intervals) to yellow discoloration and to further charring or browning for each polyvinyl chloride resin sample, at 375° F., containing dibutyltin bis(isooctyl thioglycolate) (from 3 to 0 parts per 100 parts resin) and dibutyltin oxide-diisooctyl phthalate complex (from 0 to 3 parts per 100 parts resin), each material containing the same amount of tin (18.6% Sn). Yellow discoloration is taken to be the color of the Control A after 15 minutes of heating. Charring or browning is taken to be the condition of Control A after 90 minutes of heating.

The cross-hatched area for each sample tested illustrates the time in minutes at 375° F. for the sample to reach yellow discoloration.

From this figure, it is seen that at a total concentration of 3 parts stabilizer per 100 parts resin (that is a total of 0.557 part tin per 100 parts resin), where the dibutyltin oxide-diisooctyl phthalate complex is employed in a ratio to the dibutyltin bis(isooctyl thioglycolate) ranging from 0.5:2.5 to 1.5:1.5, that is 1:5 to 1:1, the dibutyltin oxide-diisooctyl phthalate complex enhances the effectiveness of the dibutyltin bis(isooctyl thioglycolate) in lessening development of early color deterioration of the resin, while at the same time maintaining at least equivalent long term resistance of the resin to major discoloration and degradation. However, where the proportion of the dibutyltin oxide-diisooctyl phthalate complex is raised to two times and five times the amount of dibutyltin bis(isooctyl thioglycolate), it is seen that the dibutyltin oxide-diisooctyl phthalate complex actually hurts the long term stability although it provides some early color improvement. Thus, it is apparent that an excessive amount of diorganotin complex is to be avoided. This amount is determined by trial and error in each instance.

EXAMPLES 25–28

The following experiments were carried out in order to demonstrate that a given ratio of diorganotin mercapto acid ester to dioranotin oxideester complex which provides excellent stabilization and improved early color at one level of total stabilizer does not necessarily provide the same advantage when used at much higher levels of stabilizer and, in fact, may even be poorer than the di organotin mercapto acid ester used alone at that higher level.

Rigid or nonplasticized polyvinyl chloride resin formulations were prepared having the following composition:

| | Parts by weight |
|---|---|
| Polyvinyl chloride homopolymer (Diamond 40) | 100 |
| Acrylonitrile-butadiene-styrene compolymer, impact modifier (Blendex 401) | 10 |
| Lubricant (Wax E) | 0.25 |
| Stabilizers [1]. | |

[1] Noted in Table XIII, below.

The ingredients were blended to form a homogeneous mixture and the mixture was compounded on a two-roll mill at 350° F., for five minutes, sheeted off, and cut into strips. The strips were placed in an air oven heated to 375° F. and samples removed at fifteen minute intervals and attached to cards. The appearance of the samples on the cards is noted in Table XIII below.

TABLE XIII
[375° F.]

| Example | Control H | Amt. | Example 25 | Amt. | Control Y | Amt. | Example 26 | Amt. |
|---|---|---|---|---|---|---|---|---|
| Stabilizer composition | Dibutyltin bis (isooctyl thioglycolate). | 2.0 | Dibutyltin bis (isooctyl thioglycolate). Dibutyltin oxide-diisooctyl phthalate complex (Example A). | 1.3  0.7 | Dibutyltin bis-(isooctyl thioglycolate). | 4.0 | Dibutyltin bis (isooctyl thioglycolate). Dibutyltin oxide-diisooctyl phthalate complex (Example A). | 2.67  07 |

| Time (mins.) | Color | Color | Color | Color |
|---|---|---|---|---|
| Initial | Colorless | Colorless | Colorless | Colorless. |
| 15 | Yellow | Very pale yellow | Pale yellow | Do. |
| 30 | do | Pale yellow | do | Very pale yellow. |
| 45 | do | Light yellow | Light yellow | Do. |
| 60 | Yellow-brown edge | Yellow | do | Pale yellow. |
| 75 | Yellow-brown | Yellow-brown | Yellow | Yellow. |
| 90 | Brown | Brown | do | Do. |
| 105 | | | do | Do. |
| 120 | | | Yellow-brown edges | Yellow-brown edges. |

| Example | Control Z | Amt. | Example 27 | Amt. | Example 28 | Amt. |
|---|---|---|---|---|---|---|
| Stabilizer composition | Dibutyltin bis (isooctyl thioglycolate). | 6.0 | Dibutyltin bis (isooctyl thioglycolate). Dibutyltin oxide-diisooctyl phthalate complex (Example A). | 4.0  2.0 | Dibutyltin bis (isooctyl thioglycolate). Dibutyltin oxide-diisooctyl phthalate complex (Example A). | 5.0  1.0 |

| Time (min.) | Color | Color | Color |
|---|---|---|---|
| Initial | Colorless | Colorless | Colorless. |
| 15 | do | Very pale yellow | Do. |
| 30 | Very pale yellow | Pale yellow | Do. |
| 45 | do | Light yellow | Very pale yellow. |
| 60 | Pale yellow | Yellow | Do. |
| 75 | do | do | Do. |
| 90 | Light yellow | Dark yellow | Yellow. |
| 105 | Yellow | do | Do. |
| 120 | do | do | Do. |

The results in Table XIII clearly show the improved effectiveness obtained by the stabilizer combination having a ratio of 2 parts dibutyltin bis(isooctyl thioglycolate) to 1 part dibutyltin oxide-diisooctyl phthalate complex taken at two and four parts per 100 parts resin over corresponding amounts of the dibutyltin bis(isooctyl thioglycolate) alone. It is clearly seen that the complex formed from the dibutyltin oxide-diisooctyl phthalate enhances the effectiveness of the dibutyltin bis(isooctyl thioglycolate) in inhibiting development of early discoloration of the resin at these levels of total stabilizer. However, when 6.0 parts of stabilizer were used, the inventive combination which was effective at two and four parts per hundred resin at a ratio of 2:1, no longer provided the improved early color compared to the control.

However, at a ratio of 5 parts dibutyltin bis(isooctyl thioglycolate) to 1 part dibutyltin oxide-ester complex there is improvement of early color even at a level of 6 parts total stabilizer.

While there is a content of diorganotin-ester complex that is excessive, this proportion is related in some way to the total level of stabilizer in the resin, so that it is not possible to set precise numerical limits on it. This appears to be peculiar to the combination of this invention.

EXAMPLE 29

Polyvinyl chloride resin compositions were stabilized with combinations of dibutyltin bis(isooctyl thioglycolate), dibutyltin oxide-tridecyl phosphite complex and stannous octoate according to the invention.

Rigid or non-plasticized polyvinyl chloride resin formulations were prepared containing 100 parts of a vinyl chloride homopolymer (Diamond 40). 10 parts impact modifier (Blendex 401, that is, acrylonitrile-butadiene-styrene copolymer). 0.25 part lubricant (Wax E) and the stabilizers noted in Table XIV.

The ingredients were blended and compounded and then heated on a two-roll mill at 350° F., for five minutes, sheeted off and cut into strips. The strips were placed in an air oven, heated to 375° F. or 350° F. and samples removed at 15 minute intervals and affixed to cards to show the progressive heat deterioration. The appearance of the samples on the cards is noted in Table XIV below.

tin oxide-tridecyl phosphite complex in improving resistance of polyvinyl chloride resin to discoloration.

Having regard to the foregoing disclosure, the following is claimed as the patentable and inventive embodiments thereof:

1. A stabilizer composition having a controlled tin content and capable of lessening the development of early discoloroation in polyvinyl chloride resins due to heating at 350° F., comprising (a) at least one organotin mercapto acid ester having the formula:

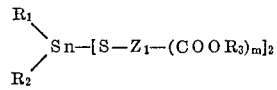

wherein $R_1$ and $R_2$ are hydrocarbon radicals having from one to about thirty carbon atoms, Z is an organic radical having from one to about thirty carbon atoms, and $R_3$ is an organic group derived from an alcohol having from one to about four hydroxyl groups and from one to thirty carbon atoms, and $m$ is an integer from one to four, and (b) a diorganotin oxide complex with an ester of an oxygen-containing acid, wherein the two organo groups are each attached to tin through carbon atoms and are hydrocarbon radicals having from one to about thirty carbon atoms, and said complex is derived from the reaction of the diorganotin oxide with an ester derived from an aliphatic or aromatic alcohol or phenol and an acid selected from the group consisting of hydrocarbyl carboxylic acids, sulfur-containing hydrocarbyl carboxylic acids, hydroxy-containing hydrocarbyl carboxylic acids, phosphoric acid, sulfuric acid, sulphurous acid, nitric acid, nitrous acid, boric acid, arsenic acid and silicic acid.

2. A stabilizer composition according to claim 1, wherein the diorganotin mercapto acid ester is a thioglycolate ester.

3. A stabilizer composition according to claim 1, wherein the organotin mercapto acid ester is a mercaptopropionate ester.

TABLE XIV (A)
[375° F.]

| Example | Example 9 | Amt. | Example 29 | Amt. |
|---|---|---|---|---|
| Stabilizer composition | Dibutyltin bis(isooctyl thioglycolate). | 1.3 | Dibutyltin bis(isooctyl thioglycolate). | 1.3 |
|  | Dibutyltin oxide-tridecyl phosphite complex (Example L). | 0.7 | Dibutyltin oxide-tridecyl phosphite complex (Example L). | 0.7 |
|  |  |  | Stannous octoate. | 0.05 |

| Time (min.) | Color | Color |
|---|---|---|
| Initial | Colorless | Colorless. |
| 15 | Very pale yellow | Very pale yellow. |
| 30 | Pale yellow | Do. |
| 45 | Yellow | Pale yellow. |
| 60 | Yellow-brown edges | Yellow. |
| 75 | Yellow-brown | Yellow-brown edges. |
| 90 | Brown | Yellow-brown. |

TABLE XIV (B)
[350° F.]

| Example | Example 9 | Amt. | Example 29 | Amt. |
|---|---|---|---|---|
| Stabilizer composition | Dibutyltin bis(isooctyl thioglycolate). | 1.3 | Dibutyltin bis(isooctyl thioglycolate). | 1.3 |
|  | Dibutyltin oxide-tridecyl phosphite complex (Example L). | 0.7 | Dibutyltin oxide-tridecyl phosphite complex (Example L). | 0.7 |
|  |  |  | Stannous octoate. | 0.05 |

| Time (min.) | Color | Color |
|---|---|---|
| Initial | Colorless | Colorless. |
| 15 | do | Do. |
| 30 | do | Do. |
| 45 | Very pale yellow | Do. |
| 60 | do | Very pale yellow. |
| 75 | Pale yellow | Do. |
| 90 | do | Do. |
| 105 | Yellow | Pale yellow. |
| 120 | do | Light yellow. |

The results in Table XIV clearly indicate that the stannous octoate enhanced the effectiveness of the combination of dibutyltin bis(isooctyl thioglycolate) and dibutyl- 4. A stabilizer composition in accordance with claim 1, wherein the diorganotin mercapto acid ester is a dialkyltin mercapto acid ester.

5. A stabilizer composition in accordance with claim 4, wherein the dialkyl portion is dibutyl.

6. A stabilizer composition in accordance with claim 4, wherein the dialkyl portion is dioctyl.

7. A stabilizer composition in accordance with claim 1, wherein the diorganotin oxide is dibutyltin oxide.

8. A stabilizer composition in accordance with claim 1, wherein the diorganotin oxide is a dioctyltin oxide.

9. A stabilizer composition according to claim 1, wherein the organotin mercapto acid ester is a dibutyltin mercapto acid ester and the diorganotin oxide-ester complex is a dibutyltin oxide-ester of an oxygen containing acid complex.

10. A homogeneous liquid stabilizer composition according to claim 1, wherein the organotin mercapto acid ester is dibutyltin thioglycolate ester and the diorganotin oxide-ester complex is a dibutyltin oxide-ester complex.

11. A homogeneous liquid stabilizer composition according to claim 1, wherein the organotin mercapto acid ester is dioctyltin thioglycolate ester and the diorganotin oxide-ester complex is a dioctyltin oxide-ester complex.

12. A stabilizer composition in accordance with claim 1, wherein the organotin mercapto acid ester is dibutyltin bis(isooctyl thioglycolate) and the diorganotin oxide-ester complex is a dibutyltin oxide-ester complex.

13. A stabilizer composition in accordance with claim 1, wherein the organotin mercapto acid ester is a dibutyltin mercaptopropionate ester and the organotin oxide-ester complex is a dibutyltin oxide-ester complex.

14. A stabilizer composition according to claim 1, wherein the molar ratio of the tin present in the organotin oxide-ester complex to the tin present in the diorganotin mercapto acid ester is within the range from about 0.25:1 to about 1:1.

15. A stabilizer composition in accordance with claim 1, wherein the tin present in the combination of the organotin mercapto acid ester and the diorganotin oxide-ester comprises from about 5 to about 45%.

16. A stabilizer composition in accordance with claim 1, wherein the tin present in the combination of the organotin mercapto acid ester and the diorganotin oxide-ester comprises from about 10 to about 30%.

17. A stabilizer composition according to claim 1, wherein the diorganotin oxide-ester complex is a reaction product of diorganotin oxide and an ester selected from the group consisting of hydrocarbyl carboxylic acid esters, hydrocarbyl thiodicarboxylic acid esters and phosphorus esters.

18. A stabilizer combination in accordance with claim 1, including, in addition, a divalent stannous tin salt, containing two groups selected from the group consisting of bromide, chloride, and organic groups which are the residue of non-nitrogenous organic compounds having an active hydrogen which is attached to oxygen or sulfur and which is replaceable by a metal.

19. A polyvinyl chloride resin composition having an enhanced resistance to early discoloration when heated at 350° F. comprising a polyvinyl chloride resin and a stabilizer composition in accordance with claim 1.

20. A polyvinyl chloride resin composition in accordance with claim 19, including, in addition, a divalent stannous tin salt, containing two groups selected from the group consisting of bromide, chloride, and organic groups which are the residue of non-nitrogenous organic compounds having an active hydrogen which is attached to oxygen or sulfur and which is replaceable by a metal.

21. A polyvinyl chloride resin composition according to claim 19, wherein the organotin mercapto acid ester is a dialkyl tin thioglycolate ester.

22. A polyvinyl chloride resin composition according to claim 19, wherein the organotin acid ester is a dialkyltin mercaptopropionate ester 23. A polyvinyl chloride resin composition according to claim 19, wherein the stabilizer composition is present in an amount within the range from about 0.25 to about 10% by weight of the resin.

24. A polyvinyl chloride resin compositiion according to claim 23, wherein the tin present in the stabilizer composition comprises from about 5 to about 45% by weight of the stabilizer composition.

References Cited

UNITED STATES PATENTS

| 2,597,920 | 5/1952 | Caldwell | 260—45.75 |
| 2,598,496 | 5/1952 | Bradley | 260—45.75 |
| 2,626,954 | 1/1953 | Albert | 260—45.75 |
| 2,629,700 | 2/1953 | Caldwell | 260—45.75 |
| 2,648,650 | 8/1953 | Weinberg | 260—45.75 |
| 2,763,632 | 9/1956 | Johnson | 260—45.75 |
| 2,914,506 | 11/1959 | Mack | 260—45.75 |

DONALD E. CZAJA, Primary Examiner

V. P. HOKE, Assistant Examiner

U.S. Cl. X.R.

252—406 R; 260—23 X